United States Patent
Rune et al.

(10) Patent No.: US 9,036,568 B2
(45) Date of Patent: May 19, 2015

(54) METHOD AND ARRANGEMENTS FOR CIRCUIT SWITCHED SERVICES IN COMMUNICATION NETWORKS

(75) Inventors: Göran Rune, Linköping (SE); Thomas Walldeen, Linköping (SE); Magnus Hallenstål, Täby (SE); Mathias Cramby, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/103,150

(22) Filed: May 9, 2011

(65) Prior Publication Data

US 2011/0274046 A1 Nov. 10, 2011

Related U.S. Application Data

(63) Continuation of application No. 12/523,147, filed as application No. PCT/SE2007/050180 on Mar. 23, 2007, now Pat. No. 8,320,291.

(51) Int. Cl.
*H04W 4/00* (2009.01)
*H04L 12/66* (2006.01)
*H04W 60/00* (2009.01)
(Continued)

(52) U.S. Cl.
CPC .............. *H04L 12/66* (2013.01); *H04W 68/12* (2013.01); *H04W 60/00* (2013.01); *H04J 11/0069* (2013.01); *H04W 8/06* (2013.01); *H04W 88/06* (2013.01)

(58) Field of Classification Search
CPC . H04W 36/0022; H04W 68/12; H04W 68/00; H04W 88/06; H04W 36/14

USPC .......... 370/312, 328, 329, 331, 332; 455/436, 455/450
See application file for complete search history.

(56) References Cited

U.S. PATENT DOCUMENTS 5,278,890 A * 1/1994 Beeson et al. ............... 340/7.24
2004/0043793 A1 3/2004 Sakata
(Continued)

FOREIGN PATENT DOCUMENTS

CN 1251249 A 4/2000
CN 101595714 A 12/2009
(Continued)

OTHER PUBLICATIONS

Ulrich Barth. 3GPP Long-Term Evolution/System Architecture Evolution Over view. Alcatel. Sep. 2006.
(Continued)

*Primary Examiner* — Jung Park

(57) ABSTRACT

The present invention relates to methods and arrangements in mobile radio telecommunications for enabling access to Circuit Switched (CS) services for a user equipment (UE) that is connected to a LTE/SAE (Long Term Evolution/System Architecture Evolution) network. The UE's current position is stored in a LTE position format in the LTE network or in the SAE network. The invention provides steps and means for transforming the UE's position in LTE format to position information in CS format for the UE, steps and means for registering the UE in the CS network using said transformed position information, and steps and means for establishing access to CS services provided by said CS network.

20 Claims, 19 Drawing Sheets

(51) Int. Cl.
*H04J 11/00* (2006.01)
*H04W 68/12* (2009.01)
*H04W 8/06* (2009.01)
*H04W 88/06* (2009.01)

(56) References Cited

U.S. PATENT DOCUMENTS

| | | |
|---|---|---|
| 2004/0184439 A1 | 9/2004 | Blanc et al. |
| 2004/0252674 A1 | 12/2004 | Soininen et al. |
| 2006/0007384 A1 | 1/2006 | Kurasawa |
| 2006/0040681 A1* | 2/2006 | Julka et al. ............ 455/458 |
| 2007/0173244 A1* | 7/2007 | Xu et al. ............... 455/422.1 |
| 2008/0037515 A1* | 2/2008 | Sander ..................... 370/352 |
| 2008/0316998 A1 | 12/2008 | Procopio et al. |
| 2010/0080171 A1 | 4/2010 | Rune et al. |
| 2010/0260115 A1* | 10/2010 | Frederiksen et al. ....... 370/329 |

FOREIGN PATENT DOCUMENTS

| | | |
|---|---|---|
| JP | 2002-186011 | 6/2002 |
| RU | 2236092 C1 | 9/2004 |
| WO | WO 99/17579 A2 | 4/1999 |
| WO | WO 02/41649 A2 | 5/2002 |
| WO | WO 2004/073279 A1 | 8/2004 |
| WO | WO 2004/112415 A2 | 12/2004 |
| WO | WO 2005/039132 | 4/2005 |
| WO | WO 2005/062632 A1 | 7/2005 |
| WO | 20060105717 A1 | 10/2006 |

OTHER PUBLICATIONS

Vodafone Group. Introduction of CS/PS Conversational indication: 3GPP TSG RAN WG2#51, R2-060490, Denver, US, Feb. 13-17, 2006.

$3^{rd}$ Generation Partnership Project; Technical Specification Group Radio Access Network; Evolved Terrestrial Radio Access (E-UTRA) and Evolved Universal Terrestrial Radio Access Network (E-UTRAN); Overall description; Stage 2 (Release 8), 3GPP TS 36.300, v.0.3.1, France, Nov. 2006.

$3^{rd}$ Generation Partnership Project; Technical Specification Group Services and System Aspects; 3GPP System Architecture Evolution; Report on Technical Options and Conclusions (Release 7); 3GPP TS 23.882 v1.6 1, Nov. 2006.

3GPP TS 23.060 V7.3.0; 3rd Generation Partnership Project; Technical Specification Group Services and System Aspects; General Packet Radio Service (GPRS); Service description: Stage 2; dated Dec. 2006 (pp. 1, 41, 43-44, 48, 171-172, and 184-185).

3GPP TS 24.008 V7.6.0; 3rd Generation Partnership Project; Technical Specification Group Core Network and Terminals; Mobile radio interface Layer 3 specification; Core network protocols Stage 3; dated Dec. 2006 (pp. 1, 287, 288).

Translation of Invalidation Request for Patent No. ZL200780049856.6 dated Mar. 10, 2014.

* cited by examiner

METHOD AND ARRANGEMENTS FOR CIRCUIT SWITCHED SERVICES IN COMMUNICATION NETWORKS

RELATED APPLICATIONS

This application is a continuation application which claims the benefit of U.S. patent application Ser. No. 12/523,147 filed on Jul. 14, 2009, patented as U.S. Pat. No. 8,320,291, which is a 371 of PCT/SE2007/050180, filed on Aug. 23, 2007, the disclosures of which are fully incorporated herein by reference.

TECHNICAL FIELD OF THE INVENTION

The present invention relates to methods and arrangements in mobile radio telecommunication. More particularly, the present invention relates to methods and arrangements for enabling access to Circuit Switched (CS) services for a user equipment (UE) that is connected to a LTE/SAE (Long Term Evolution/System Architecture Evolution) network.

BACKGROUND

As consumer demand grows for ever-richer services and connected lifestyles, mobile networks will evolve. The mobile industry is already hard at work defining the technical solutions that will allow mobile networks to meet the growing demand for wireless broadband services. Mobile networks continue to develop at an exciting pace. Future mobile networks may well support services beyond that of today's multi-megabit fixed connections, while the amount of data traffic on mobile networks could surpass that of today's broadband connections in the next decade. A radio access technology which is being developed and which would realize such networks have been given the name Long Term Evolution of Universal Terrestrial Radio Access Network—or LTE for short.

LTE will be used for mobile, fixed and portable wireless broadband access, and will offer a number of benefits to operators, aimed at increasing capacity, reducing network complexity and thus lowering deployment and operational costs. It will enable operators to meet the growing demand for mobile data solutions, making it possible for richer services to be delivered to consumers more cost effectively.

LTE defines new radio connections for mobile networks, and will utilize Orthogonal Frequency Division Multiplexing (OFDM), a widely used modulation technique that is the basis for Wi-Fi, WiMAX, and the DVB and DAB digital broadcasting technologies. The targets for LTE indicate bandwidth increases as high as 100 Mbps on the downlink, and up to 50 Mbps on the uplink. However, this potential increase in bandwidth is just a small part of the overall improvement LTE aims to provide. LTE is optimized for data traffic, and it will not feature a separate, circuit-switched voice network, as in 2G GSM and 3G UMTS networks.

LTE is being developed in the 3rd Generation Partnership Project (3GPP) and focus on the evolution of the 3G RAN (Radio Access Network). In 3GPP there is also a work item called SAE (System Architecture Evolution) that focus on the evolution of the Core Network. Both LTE and SAE focus on developing a packet-only system. LTE and SAE are being specified without co-existence for CS services fully taken into account.

A possible need for interaction with the CS domain in certain cases has however been discussed. For instance when handling mobility for a VoIP (Voice over Internet Protocol) connection to a terminal that moves into an area where VoIP cannot be provided. More information about some different solutions that are being discussed can be found in chapter 7.19.1 of the 3GPP technical report TR 23.882 v1.5.0 "3GPP System Architecture Evolution: Report on Technical Options and Conclusions", published in November 2006.

SUMMARY

An object of the present invention is to enable access for a UE to CS services while being connected to an LTE Network.

This object is achieved by means of a method for enabling access for a User Equipment (UE) to Circuit-switched (CS) services and by means of a node in a radio communication system, a UE, a Mobile Managing Entity (MME), and a Mobile Services Switching Centre according to different embodiments of the present invention.

The basic idea of the present invention is to make it possible for a UE in an LTE network that is located in an area where CS services also are provided to receive incoming CS calls and to also place outgoing CS calls. The solution according to the present invention involves transforming UE position information in an LTE format into a CS format and registering the UE in a CS network.

A first embodiment of the present invention provides a method for enabling access for a User Equipment (UE) to Circuit-switched (CS) services provided by a CS network while being connected to a Long Term Evolution (LTE) network and system architecture evolution (SAE) network, which SAE network is part of a Packet-switched (PS) core network. The UE's current position is stored in a LTE position format in the LTE network or in the SAE network. The method comprises the following steps:
   transforming the UE's position in LTE format to position information in CS format for the UE;
   registering the UE in the CS network using said transformed position information;
   establishing access to CS services provided by said CS network.

Another embodiment of the present invention provides a node in a radio communication system comprising a Circuit-switched (CS) network and a Long Term Evolution (LTE) network and System Architecture Evolution (SAE) network. A User Equipment's (UE's) current position is stored in a LTE position format wherein the node comprises processing means for transforming the UE's position in LTE format to position information in CS format.

Yet another embodiment of the present invention provides a User Equipment (UE) for use in a radio communication system. Said UE comprises means for communicating with a Packet Switched Long Term Evolution (LTE) network and System Architecture Evolution (SAE) network and means for communicating with a Circuit Switched (CS) network, wherein. Said UE further comprises means for connecting to the CS network, means for receiving an incoming Circuit-switched (CS) call. It further which comprises means for receiving a paging request regarding said incoming CS call from the CS network via said LTE network and SAE network, and means for responding to the paging request in the CS network.

Further one embodiment of the present invention provides a Mobile Managing Entity (MME) for use in a System Architecture Evolution (SAE) network connected to a Long Term Evolution (LTE) network. The MME comprises means for receiving a paging request message from a CS network regarding an incoming CS call to a User Equipment (UE)

connected to said LTE network, and means for forwarding the paging request to the UE in the LTE network.

Furthermore, one embodiment of the present invention provides a Mobile Service Switching Centre (MSC) and Visitor Location Register (VLR) for use in a Circuit Switched (CS) network. Said MSC/VLR comprises means for registering a User Equipment (UE) along with information regarding a Mobile Managing Entity (MME) controlling the UE, which UE and MME are located in a Packet Switched domain comprising at least a System Architecture Evolution (SAE) network, and means for generating and sending a page request to the a MME when receiving a CS call for the UE.

An advantage of the present invention is that it provides a possibility to use existing networks for CS services e.g. WCDMA or GSM networks to provide CS services to UEs connected to LTE networks. Thus it is made possible for LTE to interwork with 3GPP-based legacy networks which allows for service continuity. Another advantage of the present invention is that an operator will be able to provide a smooth migration for users of CS services into the corresponding PS type of service, e.g. migration of CS Voice into VoIP (provided via the packet domain) since it is possible for the operator to continue to provide the CS service in parallel with PS type services and perform the migration when the time is right (if at all).

DETAILED DESCRIPTION

In order to understand the present invention it is beneficial to first have a basic understanding of the architecture and function of a mobile radio communication system supporting Circuit Switched (CS) services according to known technology. Such a communication system is schematically illustrated in FIG. 1.

Figure 1:
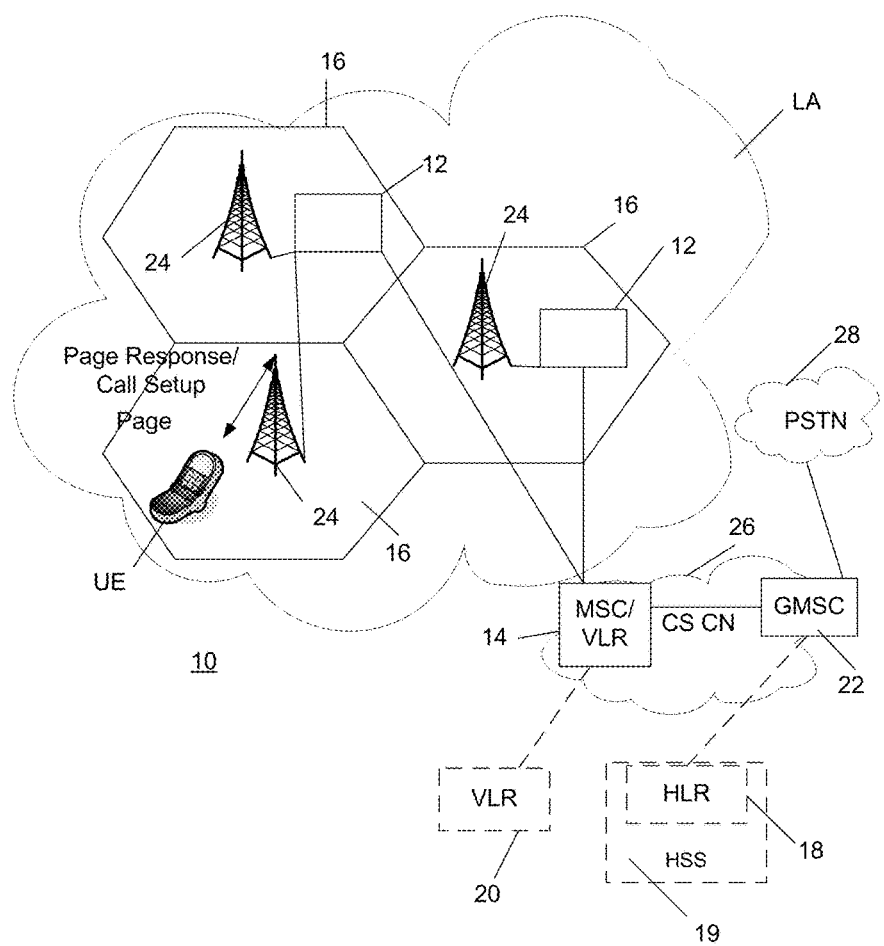
FIG. 1 is a schematic block diagram illustrating a mobile radio communications system.

The system shown in FIG. 1 may e.g. be a GSM (Global Systems for Mobile Communication) system or a WCDMA (Wideband Code Division Multiple Access) system. CS services are provided by a CS domain 10. The CS domain 10 includes a number of different types of nodes that interact to make it possible for a subscriber to make phone calls or receive calls using a User Equipment UE, such as a mobile radiotelephone, laptop, PDA, etc. The UE is able to get access to a Radio Access Network (RAN) 11. The RAN comprises a number of Radio Network Controllers (RNCs) and Radio Base Stations, if the system is a 3G system and a number of Base Station Controllers (BSCs) if the system is a 2G system. The RNC/BSC nodes are referred to in FIG. 1 by reference numeral 12. The RNC/BSCs 12 each controls a number Radio Base Stations 24 that each serves a cell 16 in a Location Area LA. One RNC/BSC 12 may control one or several Radio Base Stations 24 and may thus serve one or several cells 16. The RNC/BSCs are each connected to a Mobile Services Switching Center (MSC) 14 in a CS core network 26. The core network 26 may also include a Gateway MSC (GMSC) 22 which provides as an interface towards other networks such as PSTN (Public Switched Telephone Network) 28.

The system in FIG. 1 also includes a Home Location Register (HLR) 18 and Visited Location Register (VLR) 20. The VLR 20 is often combined with the MSC 14, creating a MSC/VLR. A remote placed VLR 20, i.e. separately located from the MSC, is also indicated in FIG. 1. The HLR may be a part of the Home Subscriber Server HSS 19.

The VLR or MSC/VLR keeps the current location of the user (terminal) in terms of in which Location Area (LA) the user is located. Registration of a user in the MSC/VLR is performed periodically and whenever the user has moved to a new LA. The HLR 18 keeps track of all active users, i.e. users attached to the system and keeps the current location of the users in terms of which MSC/VLR the users are registered in. To be able to perform an originating call or receive a terminating call the user must be registered in the MSC/VLR, and the MSC/VLR need to be known by the HLR.

At an incoming (terminating) call the GMSC 22 interrogates the HLR 18 for the location of the user. The HLR responds to the GMSC with which MSC/VLR, i.e. the MSC/VLR where the user is registered), it shall route the incoming call to. Once a call is routed to a MSC/VLR 14 said MSC/VLR 14 will send a page to the user, typically in the LA where the user is registered (LA stored in VLR). The user responds to the page so that the call to the user can be completed.

An originating call is initiated by the user. The user's UE sends a call request to the MSC/VLR to establish the call. The call is routed from the MSC/VLR all the way to the called party, e.g. a user in PSTN (Public Switched Telephony Network). At an originating call it is important that the user is registered in the MSC/VLR prior to call establishment. The reason is that the MSC/VLR retrieves user data from the HLR during the registration. This user data is fundamental to the call handling in the MSC/VLR since the data contain information on which services the user may or may not use, which supplementary services that are active/inactive, calling party number presentation parameters (allowed, not allowed, restricted, . . . ). Consequently the user is typically only allowed to initiate a call via an MSC/VLR where it is already registered, i.e. the registration is fundamental for the call success of both originating and terminating calls.

In the following specification of the invention, the expression "set of LAs" will be used. Said expression should be interpreted as comprising the LA where the UE is registered and a list of LAs controlled by the MSC/VLR where the UE is registered.

Furthermore the expression "list" should herein be interpreted as a set of data in any electronic form.

Figure 2:
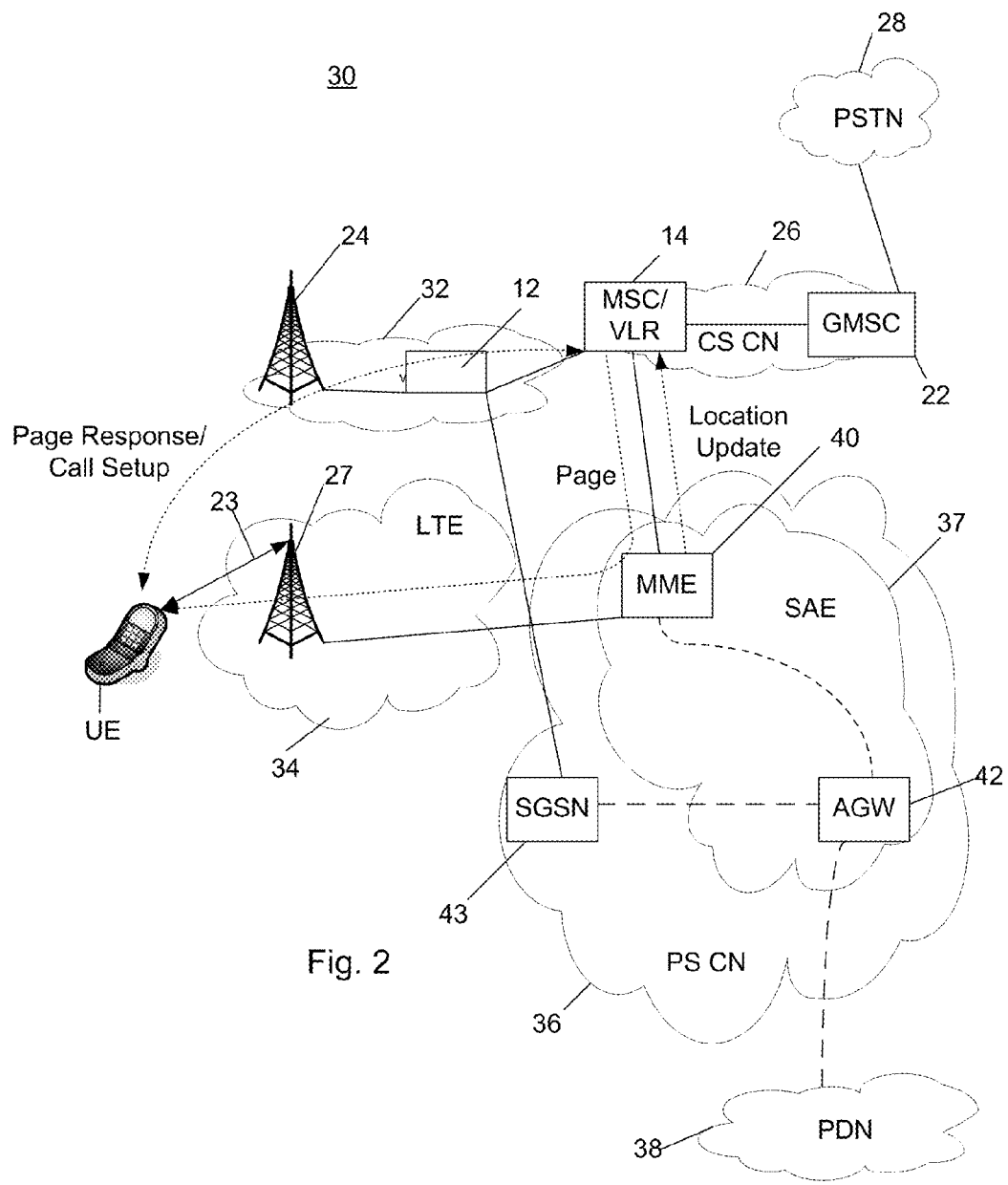
FIG. 2 is a schematic block diagram showing a communications system in which an embodiment of the present invention is implemented.

In FIG. 2, a communications system in which the present invention may be implemented and used is illustrated. The system comprises both a CS Domain and a Packet Switched (PS) Domain. The CS Domain comprises at least a Circuit Switched Core Network (CS CN) 26. The PS domain comprises at least a Packet Switched Core Network (PS CN) 36. A part of the PS CN 36 is an SAE (System Architecture Evolution) network 37. The LTE network 34 is an access network for UE's visiting the LTE cells controlled by LTE 34. The LTE comprises a number of eNode Bs 27 connected to and communicating with Mobility Management Entity node (MME) 40.

Within an LTE cell, the eNode B 27 will be able to establish and maintain contact with visiting UEs via the air interface 23. The PS CN 36 comprises a number of nodes. Only two nodes are illustrated in FIG. 2, a Mobility Management Entity node (MME) 40 and an Access Gateway Node (AGW) 42, which nodes are able to communicate with between themselves, and other entities in the network and entities in other networks. The AGW 42 is an interface node 42 connecting other Packet Data Networks PDN 38, such as Internet, to the PS CN 36. The MME 40 of the SAE corresponds functionally to an Service GPRS Support Node SGSN (without user plane handling) and is therefore adapted to communicate with and manage eNode Bs 27 of the LTEs. In the PS CN, the SGSN 43 is the gateway between the RNC 12 and the core network in a GPRS/UMTS network. It mediates access to network resources on behalf of UEs (mobile subscribers) and implements the packet scheduling policy between different QoS classes. It is responsible for establishing the Packet Data Protocol (PDP) context with GGSNs (gateway GPRS support node) upon activation. Said eNode B 27 corresponds to the Radio Network Controllers RNC combined with the RBS of WCDMA.

As described above (see FIG. 1), the UE will access the CS CN 26 via one of the Radio Base Stations 24 of the RAN 32. Each RAN is controlled and managed by a MSC/VLR 14, as also mentioned above. GMSC 22 of the CS CN is able to switch/route a circuit switched telephone call from or to the PSTN 28 to the MSC/VLR 14. However, the UE has to be registered to the correct MSC/VLR, i.e. the MSC/VLR controlling the Location Area that the UE is currently visiting.

The basic idea of this invention is to enable access to CS services for a UE while being connected to a LTE network 34. This is achieved by providing means for the UE to access CS services where CS services are provided by an operator's CS network. Means are also provided to enable incoming CS calls reaching the subscriber, even when being in the packet-only access LTE network. Therefore, a communication connection is established between the MME 40 and the MSC/VLR 14. The MME 40 is therefore able to send Location Updates about visiting UEs. Further, a terminating call for a visiting UE will be handled by the MSC/VLR 14, which generates and sends a Page Request message to the current UE via the MME 40 and eNode B 27 to the UE. Said path is indicated in FIG. 2 as a dotted line "Page". With received information, e.g. from page requests, or broadcast information, or information on dedicated channel, the UE is adapted to establish access to the CS domain via an RAN 32 controlling the GSM/WCDMA cells and sending a Page Response to the correct MSC/VLR handling the terminating call. Said path is indicated as a dotted line Page Response/Call Setup. The present invention is also enabling initiation of originating calls.

When an UE is switching between LTE/SAE and 2G/3G, the AGW 42 will secure that the same IP address is maintained after the switch. The AGW is allocating IP addresses.

One embodiment of the invention relates to a method for enabling access for a User Equipment (UE) to Circuit-switched (CS) services provided by a CS network while being connected to a Long Term Evolution (LTE) and system architecture evolution (SAE) Network. A UE's current position is stored in a LTE position format in the LTE network or in the SAE network.

Figure 3:
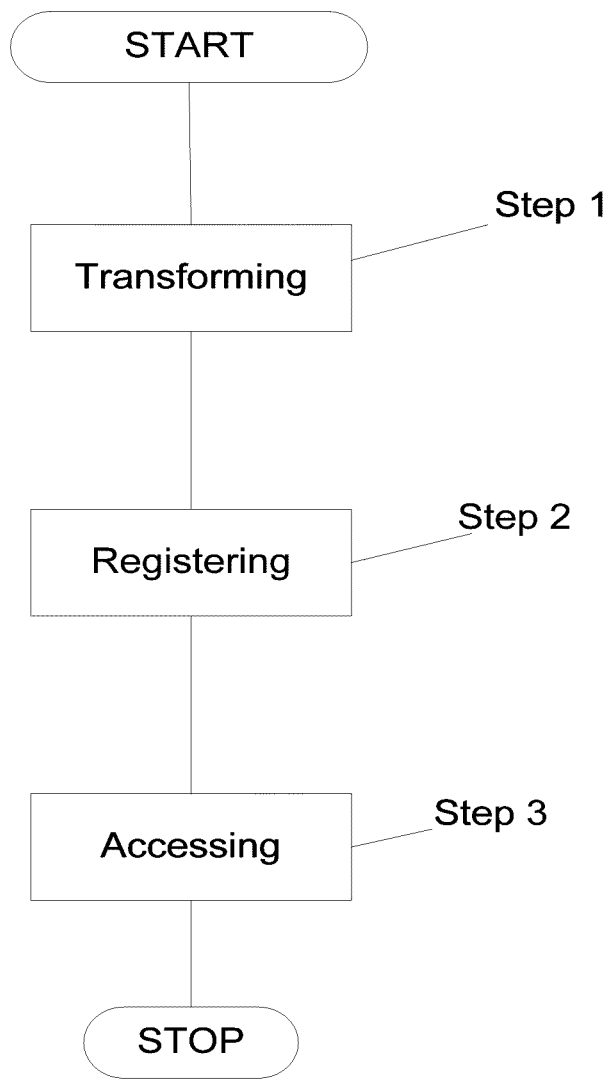
FIG. 3 is a flowchart illustrating an embodiment of the method according to the present invention.

Said method is illustrated in the flowchart in FIG. 3.

The method comprises the following steps:
transforming the position information regarding the UE's position in LTE format to position information in CS format (step 1);
registering the UE in the CS network using said transformed position information (step 2);
establishing access to CS services provided by said CS network (step 3).

By registering the UE in the CS network as mentioned above the UE is able to access CS services, which includes receiving a terminating CS call and placing an originating CS call. According to embodiments of the present invention a terminating call would involve the UE being paged (for the CS service) in LTE and a page response would be sent to the CS domain guided by information provided from the network. Furthermore according to embodiments of the present invention an originating call would involve the UE connecting to the CS domain in which the UE is registered and placing the CS call.

The invention decouples the migration of CS services to the PS domain from the deployment of LTE and SAE.

In the transforming step, step 1, the LTE position information is either the LTE cell identity or the Tracking Area TA identity, or a combination of said LTE cell identity and said TA identity.

The transforming step will now be explained with reference to FIG. 4. This figure illustrates the infrastructure 50 of 2G/3G Location Area LA, 2G/3G cells, LTE Tracking Areas TA and LTE cells.

A geographic area is covered of Location Areas LA LA1, LA2, LA3, . . . . Each of said LAs are controlled by one MSC POOL. In FIG. 4 there are two MSC POOLs, MSC POOL 1 and MSC POOL 2. Each MSC POOL consist of a set of MSCs. E.g. MSC POOL1 includes the MSC1:1, . . . , MSC1:n, and MSC POOL2 includes the MSC2:1, . . . , MSC2:n. Each LA is divided into 2G/3G cells. The cell structure is illustrated and discussed in connection to FIG. 1. Each cell are managed and controlled by Radio Network Controllers RNCs or Base Stations BSCs. An example of usable CS position information format is cell identity and Location Area Identity LAI.

LTE and SAE system uses another format than the CS position information format. In the LTE position information format is Tracking Area identities TAI and LTE cell identities used. As illustrated in FIG. 4, Tracking Areas may not cover just one Location area. Hence, there is no one-to-one correspondence between LAs and TAs. It is therefore necessary to perform a transformation between the two formats. This transformation may be a mapping process. Mapping tables are therefore provided and stored. Said mapping tables may define which TAI corresponds to which cells 16 or LAI (-s).

Figure 4:
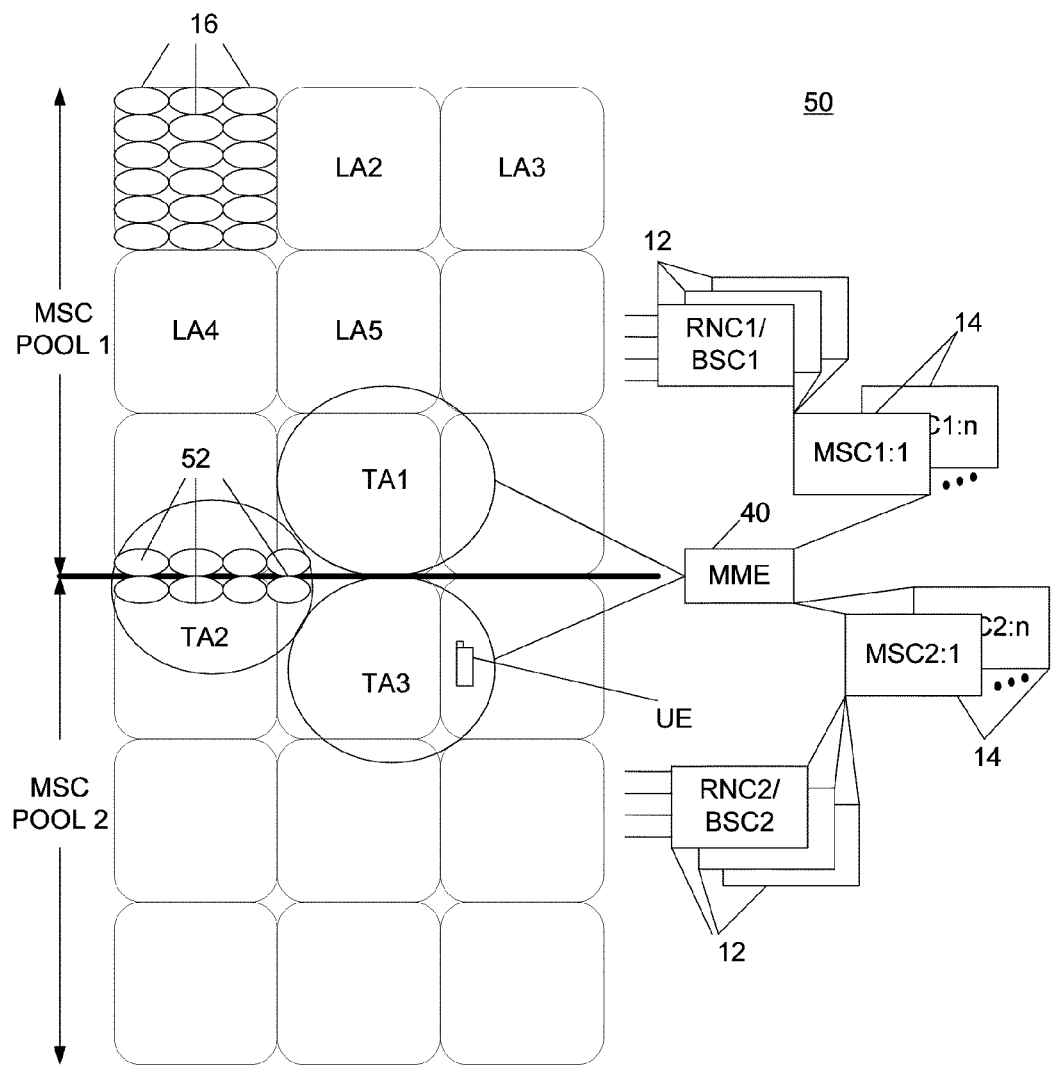
FIG. 4 is a schematic block diagram illustrating an example of cell, Location Area and Tracking Area matching between cell infrastructures of an LTE network and a 2G/3G system.

In FIG. 4, a Tracking Area TA2 is shown that stretches over two location areas serviced by two different MSCs, or MSC pools. Therefore, the LA has to be mapped from LTE cell level.

The MME 40 controls and manages the eNode Bs of the LTE cells and the tracking areas TAs. Each TA is handled and controlled by the MME 42.

According to the invention, the transforming step may be performed in a Mobility Management Entity (MME) node, an MSC/VLR node or an eNode B node. In the following, the registration step of the invented method will be explained with reference to a number of embodiments. For enabling the transforming step, a mapping table must be available in one of the nodes storages. It is therefore necessary to have performed a storing process of the mapping table. Such a mapping table may be provided by the operator of the system.

A mapping table is preferably designed to achieve the wanted transform. The mapping tables comprise at least two columns linking one area to another area, e.g. LTE cell identities to a Location area Identity. In this specification, the transform from LTE cells to Location areas, or Tracking Areas to Location Areas, or a combination of said mapping tables used. However, mapping tables are not limit to the described embodiments regarding number of columns or direction of transformation. It is important to note that it for instance is possible to map multiple Tracking Areas to one or several Location Areas.

Figure 5:
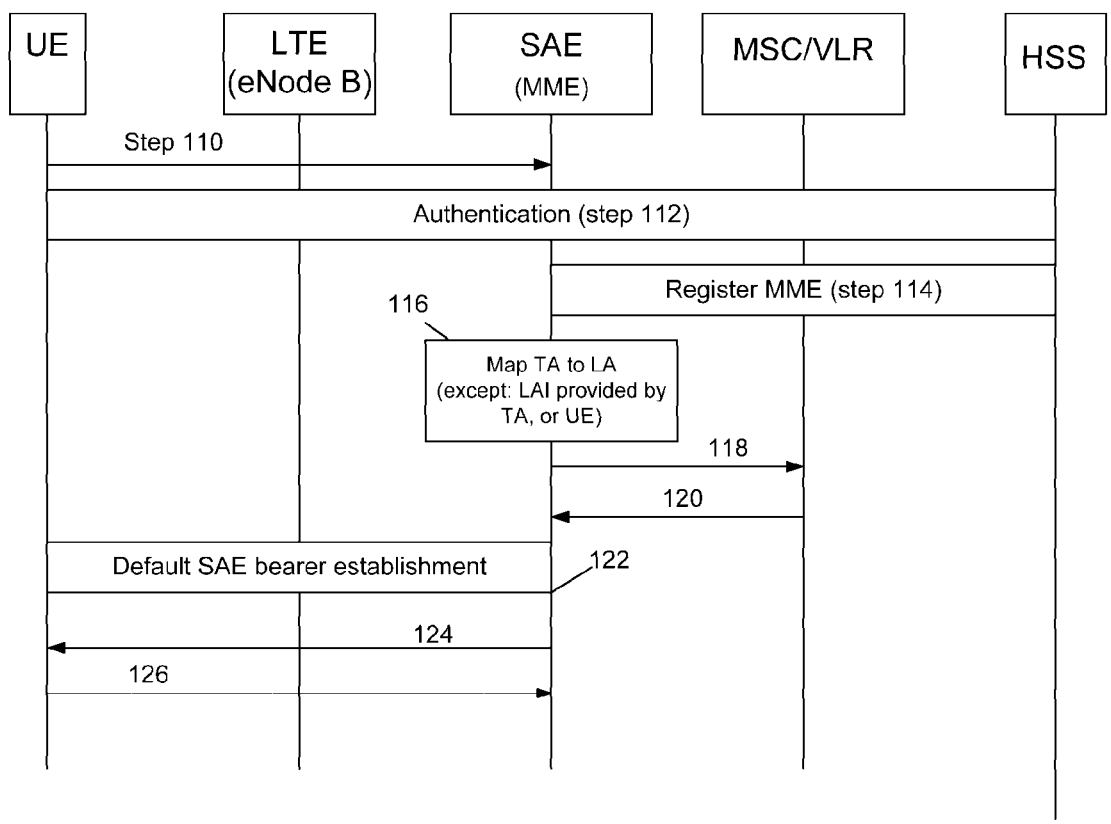
FIG. 5 is a flowchart illustrating a first embodiment of the invention for enabling access.

The registering method step, step 2, and the accessing step, step 3, will now be explained and discussed in connection with a number of embodiments of the invention With reference to FIG. 5, a first embodiment for enabling access, or initial access, will now be described. The UE will acquire Location area (LA) Information, e.g. identity, from the broadcasted information of a broadcast channel provided in the LTE cell where the UE is camping.

On demand, in step 110, a user's UE is adapted to generate and send an Attach request via the eNode B in the LTE network to the Mobility Management Entity, MME, which in the SAE network. When the Attach Request is received by said MME it is adapted to start and run the authorization process, step 112. Said authorization process is a standard process and therefore regarded as known by a person skilled in the art. When the authorization process is finished and the UE is accepted, the LTE registration process, step 114, in the MME is initiated where the MME registers with the Home Subscriber Server (HSS). The Home Subscriber Server is the master user database that supports the communication system entities that handle the calls/sessions. It contains user profiles, performs authentication and authorization of the user, and the Home Location Register (HLR).

To be able to register the UE properly in the MSC/VLR, a transforming step, step 116, is performed to transform LTE position information for the UE to CS format position information that is a useable format for the Mobile Service Switching Center and the Visitor Location Register, MSC/VLR. The transformation step may be performed either in the eNode B of said cell of interest, or in the MME.

When the transformation procedure step is finished, a registration to CS network procedure is initiated. A Location Update Request is sent, step 118, from the MME in the SAE to the MSC/VLR. Said request message comprises a number of information parameters, e.g. International Mobile Subscriber Identity IMSI, LAI, old LAI, "Attach ind", etc. The MSC/VLR registers the UE and responds back, step 120) to the MME with a Location Update Accept message comprising at least a parameter called Suitable LAs (suitable Location Areas). The Suitable LAs is a list of LAs controlled by the MSC/VLR where the UE is registered. The parameters are stored in the MME and the registration procedure to CS network finishes.

After the registration procedure, the MME is adapted to run the SAE bearer establishment process, step 122, via the eNode B station to which the UE is connected via LTE. The SAE bearer is the corresponding term for PDP Context in GSM/WCDMA. When the establishment is finished, the MME sends an Attach Accept message to the UE, step 124. Said message comprises a number of parameters, e.g. TMSI, LAI, Suitable LAs. The UE responds by sending an Attach Confirm message to the MME, step 126. The process for enabling access for a User Equipment (UE) to Circuit-switched (CS) services provided by a CS network is finished, and it is possible for the UE to initiate any provided CS service, e.g. initiating a voice call or receiving a voice call over the Circuit-Switched Domain using 2G/3G standards.

Figure 6:
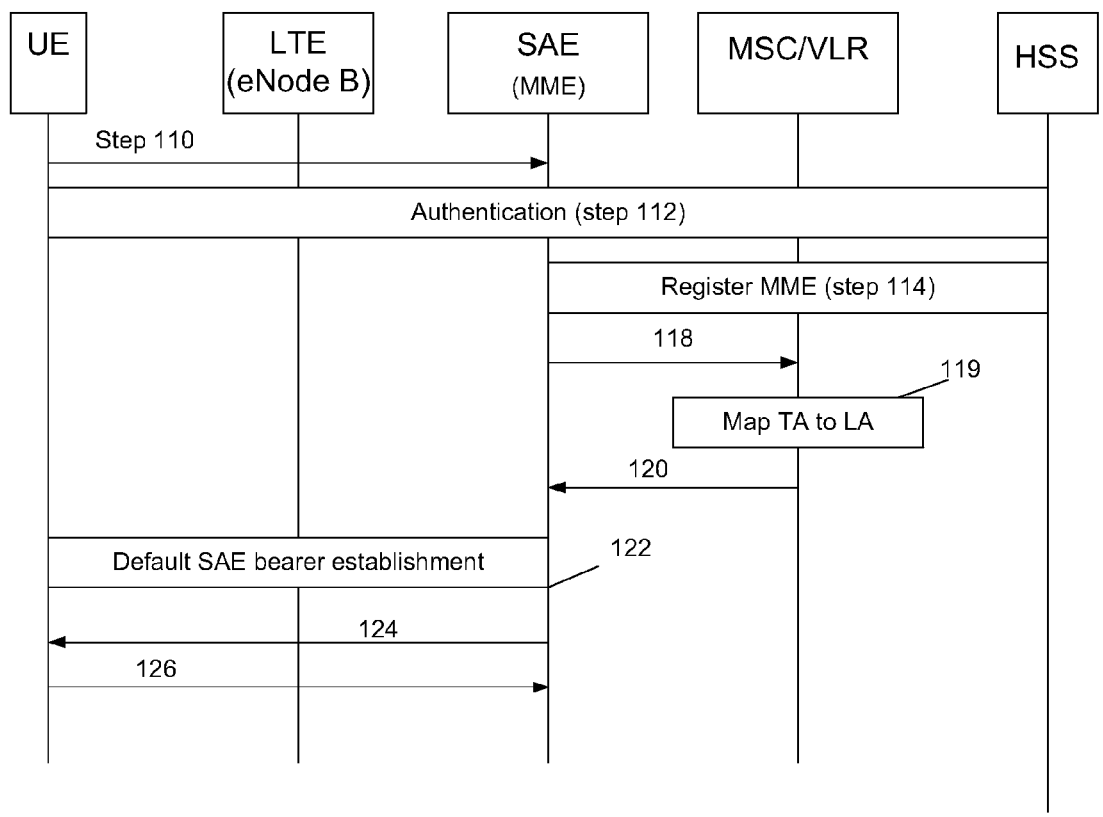
FIG. 6 is a flowchart illustrating an embodiment of the method according to the invention.

As indicated in the signal flowchart, other information transfer may optionally be included in the process. As an example, a TMSI Reallocation Complete messages (indicated as a dashed arrow) may be sent from the MME to the MSC/VLR node. With reference to FIG. 6, a second embodiment for enabling access, or initial access, will now be described. The process of FIG. 6 is similar regarding the process steps in the registration process described in FIG. 5. Said common steps (same reference numbers) will not be described again. Reference is therefore made regarding the similar steps and processes to the description of the process in FIG. 5.

The difference between the two processes is the place, i.e. the node, where the transforming step is executed. In the first embodiment of the invented method, see FIG. 5, the transforming step 116 is executed in the MME. In the second embodiment, said transforming step, here denoted step 119, is performed in the MSC/VLR. Therefore, the Location Update Request message, step 118, is sent from the MME with the necessary information to the MSC/VLR before the transforming step, step 119, of the location/position information is executed. In the embodiment according to FIG. 6, compared to the embodiment shown in FIG. 5, said necessary information includes UE position information in LTE format since the mapping to CS format is performed in the MSC/VLR in step 119.

The present invention also relates to registration methods due to mobility of the UE. For an example, when the UE moves from one cell to another, an Update process of the registers is started.

Different embodiments of the registration process according to the invention will be described with reference to FIGS. 7-12. The registration process will be executed due to the mobility of UE. In the exemplified variants showed in FIGS. 7-9, the LTE network will be in the state LTE_Idle, but the LTE network is in state LTE_Active in the embodiments described according to FIGS. 10-12. Further, in LTE_Active a connection between the UE and LTE network is established.

Figure 7:
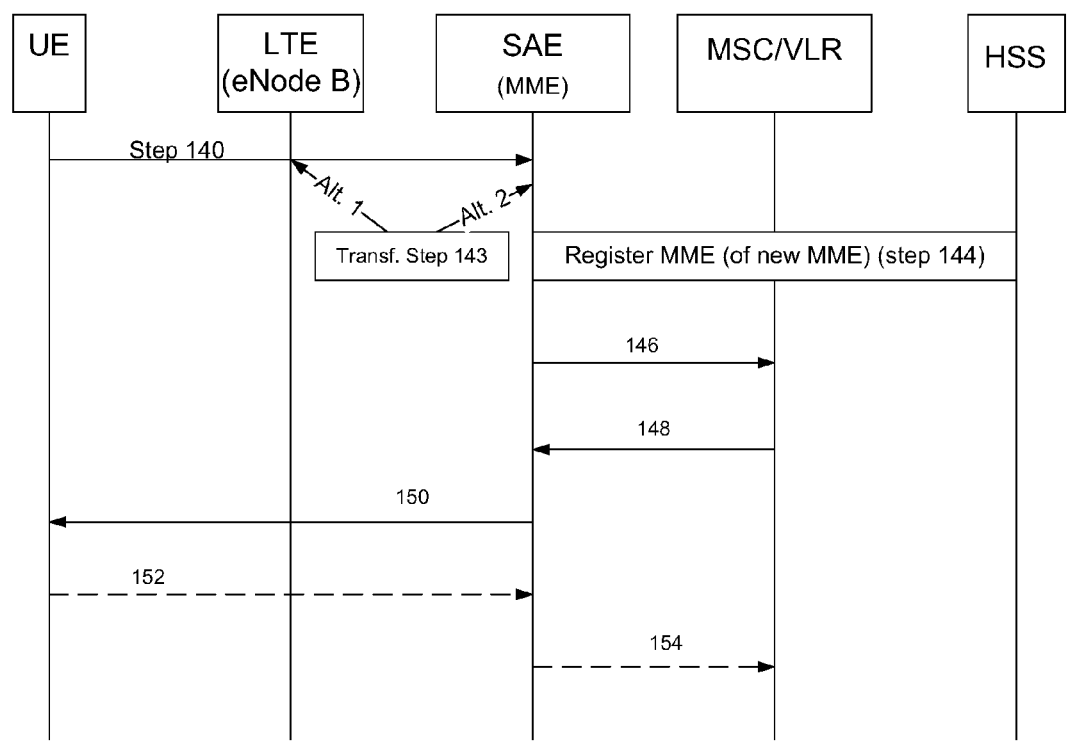
FIGS. 7-9 are flowcharts illustrating different embodiments of the registration process according to the invention when the state is LTE_Idle.

In FIG. 7, the first embodiment of the invented registration due to mobility process is illustrated as a signal flowchart diagram. The position information is read from the eNode B broadcast channel. In the first step, 140, the UE is adapted to initiate the TA/LA Update by sending either a combined TA/LA Update Request message or an LA Update Request message comprising a number of parameters, e.g. S-TMSI (SAE TMSI), old LAI, to the MME of the SAE network. Thus, LAI of the accessed cell by the UE is provided by LTE network to SAE in the message used to transport the combined TA/LA Update Request message or the LA Update Request message.

To be able to register the UE properly in the MSC/VLR, a transforming step, 143, is necessary to perform to transform LTE position information format for the UE to CS position information format that is a useable format for the Mobile Service Switching Center and the Visitor Location Register, MSC/VLR. The transforming step 143 may be performed either in the eNode B (Alternative 1) or in the MME (Alt. 2).

The LTE registration process in the MME, step 144, is initiated and Subscriber Information acquired from the Home Subscriber System (HSS), which system comprises the HLR.

A registration to CS network procedure is initiated. A Location Update Request is sent, step 146, from the MME in the SAE to the MSC/VLR. Said request message comprises a number of information parameters, e.g. International Mobile Subscriber Identity IMSI, LAI, old LAI, "Attach ind", etc.

In the registration process step, the MSC/VLR registers the UE and responds back, step 148, to the MME with a Location Update Accept message comprising at least a parameter called Suitable LAs (suitable Location Areas). The Suitable LAs is a list of LAs controlled by the MSC/VLR where the UE is registered. The parameters are stored in the MME and the registration procedure to CS network finishes.

After the registration procedure, the MME is adapted to send a combined TA/LA Update Ack message or an LA Update Ack message (which message depend on the Request message sent in step 140) to the UE, step 150. Said message may comprise a number of parameters, e.g. S-TMSI, LAI, Suitable LAs.

It is now possible for the UE to initiate any provided CS service, e.g. initiating a voice call or receiving a voice call over the Circuit-Switched Domain using 2G/3G standards.

As indicated in the signal flowchart, other information may optionally be included in the process. As an example, a TMSI Reallocation Complete messages (indicated as a dashed arrow) may be sent, step 152, from the UE to the MME, and from the MME to the MSC/VLR node, step 154.

Periodic LA Update can be performed either as part of periodic TA Update (timer co-ordination between LTE and CS), as an LA Update, or by the MME autonomously. Periodic LA Update will be described in more detail in a special section of this description.

Figure 8:
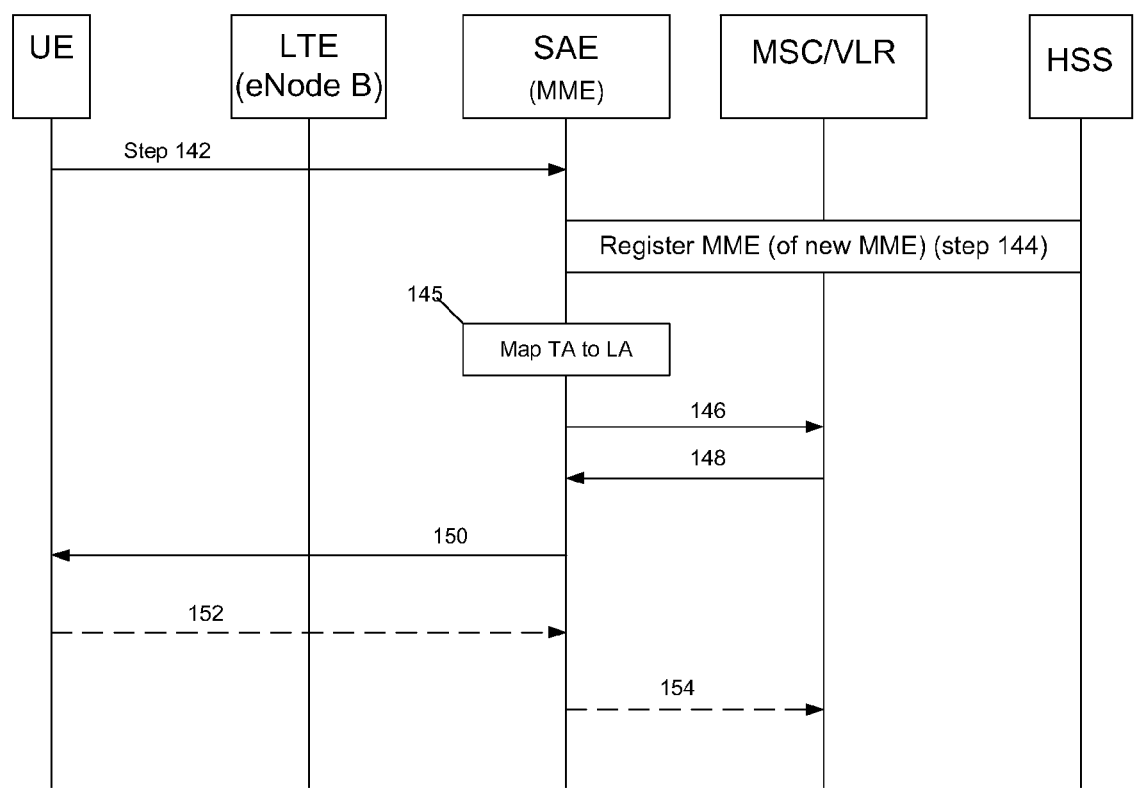

Another embodiment of the invented registration process will now be described with reference to FIG. 8. The process of FIG. 8 is partly similar regarding the process steps in the registration process described in FIG. 7. Said common similar steps will not be described again. Reference is therefore made regarding the similar steps and processes to the description of the process in FIG. 7. The main difference is that the position information is known by the MME and Position information is not read from the broadcast.

In the first step, 142, the UE is adapted to initiate the TA Update by sending a TA Request message comprising S-TMSI parameter.

The registration process, 144, in the MME is initiated and Subscriber Information is acquired from the Home Subscriber Server (HSS).

The Tracking Area Identity TAI is known by the MME, but to be able to register the UE properly in the MSC/VLR, a transforming step, 145, is necessary to perform to transform LTE position information format to CS position information format to decide the right LA and MSC/VLR.

In the registration process, the MME registers the UE, by sending Location Request message, step 146, to the MSC/VLR. The MSC/VLR responds back to the MME with a Location Update Accept message, step 148, comprising at least a parameter called Suitable LAs (suitable Location Areas). The Suitable LAs is a list of LAs controlled by the MSC/VLR where the UE is registered. The parameters are stored in the MME and the registration procedure finishes.

After the registration procedure, the MME sends a TA Update Ack message to the UE, step 150. Said message may comprise a number of parameters, e.g. S-TMSI, LAI, Suitable LAs.

Periodic LA Update can be performed either as part of periodic TA Update (timer co-ordination between LTE and CS), as an LA Update, or by the MME autonomously.

Figure 9:
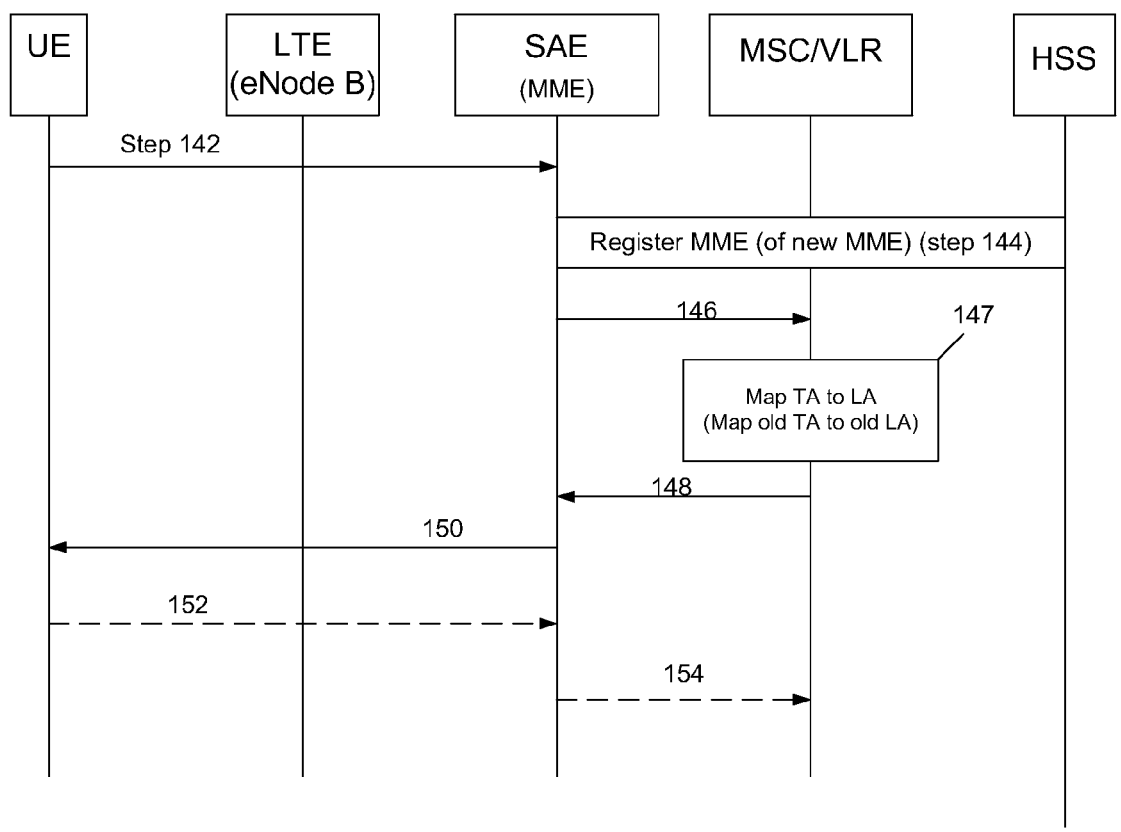

Yet another embodiment of the invented registration process when LTE is in LTE_Idle state will now be described with reference to FIG. 9. The process of FIG. 9 is partly similar regarding the process steps in the registration process described in FIG. 8. Reference is therefore made regarding similar steps (identical reference numbers) and processes to the description of the process in FIG. 8.

The difference between the two processes is where, i.e. in which node, the transforming step is executed. In the second embodiment of the invented method, see FIG. 8, the transforming step is executed in the MME. In the third embodiment, said transforming step (step 147) is performed in the MSC/VLR. Therefore, the Location Update Request message is sent, step 146, from the MME with the necessary information to the MSC/VLR before the transforming step, step 147, of the location/position information is executed.

Even in the third embodiment (in FIG. 9), in LTE_Idle state, Periodic LA Update can be performed either as part of periodic TA Update, e.g. timer co-ordination between LTE and CS, as an LA Update, or by the MME autonomously.

Figure 10:
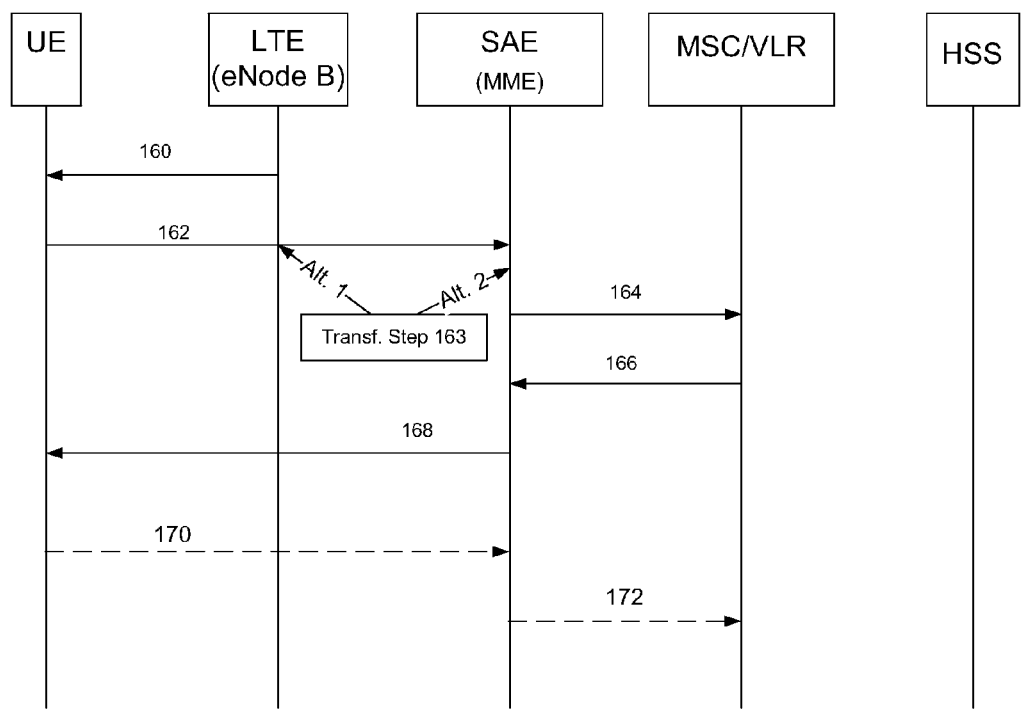
FIGS. 10-12 are flowcharts illustrating different embodiments of the registration process according to the invention when the state is LTE_Active.

In the following, three different embodiments of the registration process for CS access when the registration is due to Mobility will be described with reference to FIGS. 10-12. Common for all three examples is that the LTE is LTE_Active, and the process is able to use an already established dedicated channel to the UE in LTE network.

A first embodiment wherein LTE_Active state is present will now be described with reference to FIG. 10. When the UE switches from one area controlled by an eNode B and enters an area controlled by another eNode B in the LTE, the second eNode B updates the UE with the current CS CN Info by sending LAI and Periodic LA Update Timer, step 160. LAI CS CN info is also included in the broadcast and may therefore be read from the broadcast channel. In the first step, step 162, of the process, the UE sends LA Update request. The periodic LA Update timer indicates when the UE must transmit a LA Update message Request message to the MME via the LTE. LAI of the accessed cell is provided by LTE to SAE in the message used to transport the Combined TA/LA Update Request message or the LA Update Request message to MME in SAE.

To be able to register the UE properly in the MSC/VLR, a transforming step 163 is necessary to transform LTE position information format to CS position information format that is a useable format for the MSC/VLR. The transforming step may take place either in eNode B or MME node. A mapping transformation is necessary on cell level, i.e. LTE cell to LA The transforming step 143 may be performed either in the eNode B (Alternative 1) or in the MME (Alt. 2).

When the transforming procedure is finished, a registration to CS network procedure is initiated. A Location Update Request is sent, step 164, from the MME in the SAE to the MSC/VLR. Said request message comprises a number of information parameters, e.g. International Mobile Subscriber Identity IMSI, LAI, old LAI, "Attach ind", etc. The MSC/

VLR registers the UE and responds back to the MME with a Location Update Accept message, step 166, comprising at least a parameter called Suitable LAs (suitable Location Areas). The Suitable LAs is a list of LAs controlled by the MSC/VLR where the UE is registered. The parameters are stored in the MME and the registration procedure finishes.

In the next step, 168, MME is adapted to send a LA Update Ack message to the UE. Said message comprises at least the parameter Suitable LAs to be read and stored by the UE.

As indicated in the signal flowchart, other information may optionally be included in the process. As an example, a TMSI Reallocation Complete messages (indicated as a dashed arrow) may be sent, step 170, from the UE to the MME, and from the MME to the MSC/VLR node, step 172.

Periodic LA Update can be performed in the same way as registration—Periodic LA Update Timer is provided by CS CN Info—or by the MME autonomously or as part of the Registration.

Figure 11:
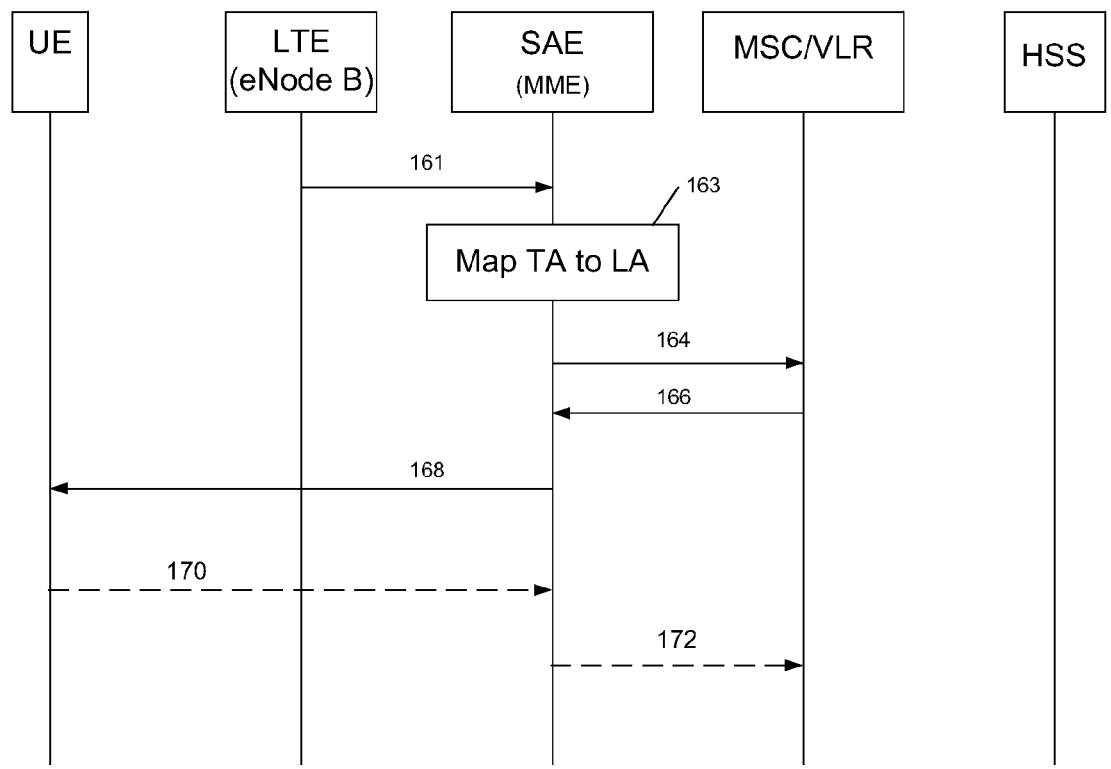
Figure 12:
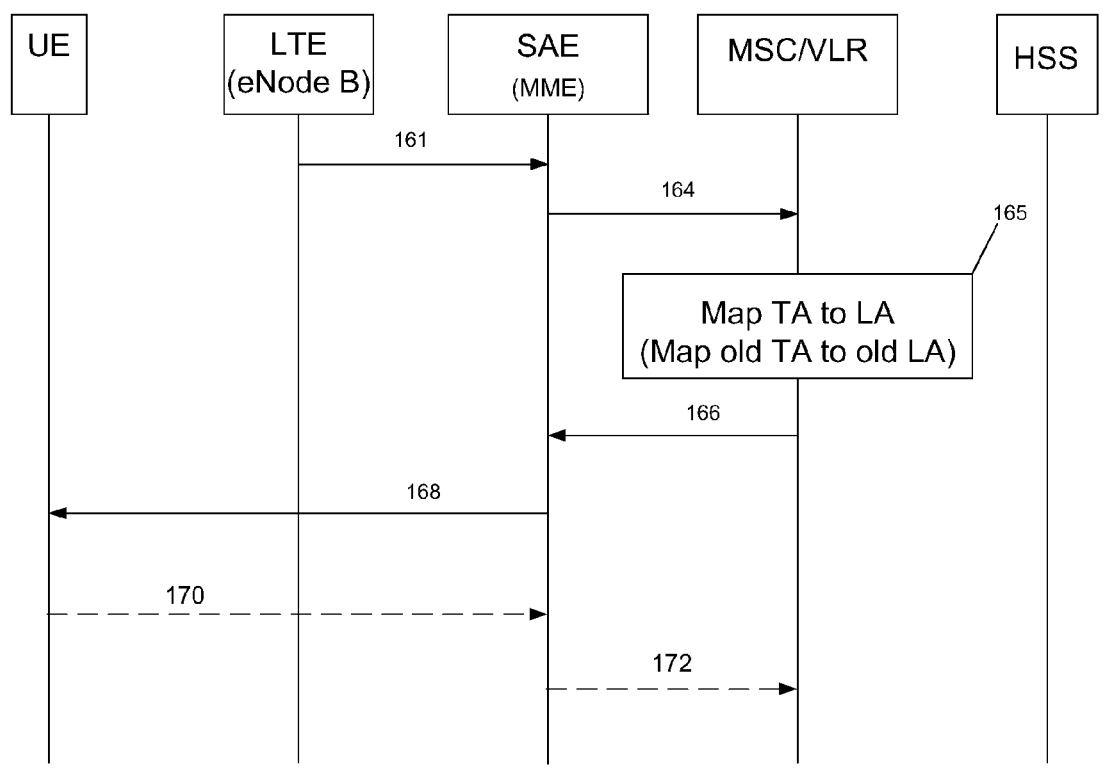

Another embodiment of the invented registration process due to mobility will now be presented with reference to FIG. 11.

When the UE switches from one Tracking Area to another TA and enters an area in said "new" TA controlled by a eNode B in the LTE, the eNode B sends a Position Update message, step 161, to the MME. Sending the "Position Update" can also be part of a message related to the mobility handling, either implicitly, i.e. understood from the context of mobility, or explicitly, i.e. explicit information on the position change is included.

The MME initiates a transforming step, step 163, to be able to register the UE properly in the correct MSC/VLR. This may be done by the stored mapping table mapping, as previously described.

When the transforming procedure step is finished, a registration to CS network procedure is initiated. A Location Update Request is sent, step 164, from the MME in the SAE to the MSC/VLR. Said request message comprises a number of information parameters, e.g. International Mobile Subscriber Identity IMSI, LAI, old LAI, "Attach ind", etc. The MSC/VLR registers the UE and responds back, step 166, to the MME with a Location Update Accept message comprising at least a parameter called Suitable LAs (suitable Location Areas). The Suitable LAs is a list of LAs controlled by the MSC/VLR where the UE is registered. The parameters are stored in the MME and the registration procedure finishes.

If "Suitable LAs" provided during Location Update Request procedure, the MME is adapted to send, step 168, a message New LA Info that comprise at least the parameter Suitable LAs.

As indicated in the signal flowchart, other information may optionally be included in the process. As an example, a TMSI Reallocation Complete messages (indicated as a dashed arrow) may be sent, step 170, from the UE to the MME, and from the MME to the MSC/VLR node, step 172.

Yet another embodiment of the invented registration process when LTE is in LTE_Active state will now be described with reference to FIG. 12. The process of FIG. 12 is partly similar regarding the process steps in the registration process described in FIG. 11. Said common similar steps will not be described again. Reference is therefore made regarding the similar steps and processes to the description of the process in FIG. 11.

The difference between the two processes is where the transforming step is executed. In the second embodiment transforming step 165 is performed in the MSC/VLR. Therefore, the Location Update Request message is sent from the MME with the necessary information to the MSC/VLR before the transforming step of the location/position information is executed.

In the following, the registration process to CS services will be discussed depending on which of the system nodes that are adapted to be responsible for the LA Update process. The two alternatives are:
Alternative 1) The MME—on behalf of the UE;
Alternative 2) The User Equipment UE.

Both the above alternatives imply the UE will be attached for CS services while camping in LTE cells.

1) MME Responsible for the LA Update.
   1.1. Update Embodiments when UE is Registered for CS in (MSC/)VLR.
   1.1.a) The MME is adapted to register the UE at TA Update.
   1.1.a.i) To enable paging of the correct MME, i.e. the MME controlling the area where the UE is registered, LA and/or MME address is stored in the MSC/VLR. A mapping between LTE format and CS format of UE position information is performed in the MME and will result in the correct LA in VLR. The same result is achieved if the mapping transformation is performed by the MME (alternative 1) or by the MSC/VLR (alt. 2).
   1.1.a.ii) LA identity is stored in the UE for enabling originating call in the LA to be received by the MSC/VLR controlling said LA. To Update the stored LA identity, the MSC/VLR is adapted to respond with a suitable LA or set of LAs as a response to the registration in the MSC/VLR. The set of LAs consist of the LA where the UE is registered and a list of LAs controlled by the MSC/VLR where the UE is registered. This LA or set of LAs is provided to the UE. The LA (set of LAs) can be used to find suitable GSM/WCDMA cells to access at originating and/or terminating calls. One alternative process is to use an adapted MME for providing the LA used in the registration to the UE.
   1.1.b) At LTE_Active Mobility Position update, the MME is adapted to register the UE.
   1.1.b.i) To enable paging of the correct MME, i.e. the MME controlling the area where the UE is registered, LA and/or MME address is stored in the MSC/VLR. A mapping between LTE format and CS format of UE position information is performed in the MSC/VLR and will result in the correct LA in VLR. The same result is achieved if the mapping transformation is performed by the MSC/VLR.
   1.1.b.ii) LA identity is stored in the UE for enabling originating call in the LA to be received by the MSC/VLR controlling said LA. To Update the stored LA identity, the MSC/VLR is adapted to respond with a suitable LA or set of LAs as a response to the registration in the MSC/VLR. This LA or set of LAs is provided to the UE. The LA identity or set of LA identities can be used to find suitable GSM/WCDMA cells to access at originating and/or terminating calls. The set of LAs consist of the LA where the UE is registered and a list of LAs controlled by the MSC/VLR where the UE is registered. One alternative process is to use an adapted MME for providing the UE to the LA used in the registration.
   1.2. Periodic LA Update Embodiments
   1.2.a The MME is adapted to register the UE based on the timer for periodic LA Update received from the MSC/VLR or read from the memory of the MME or provided to the MME by other means.
   1.2.a.i. To enable paging of the correct MME, i.e. the MME controlling the area where the UE is registered, LA and/or MME address is stored in the MSC/VLR. A mapping between LTE format and CS format of UE position information is performed in the MME or the MSC/VLR, and the mapping will result in the correct LA in VLR. The same result is achieved if the mapping transformation is performed by the MME or the MSC/VLR.

1.2.a.ii) LA identity is stored in the UE to enable originating call in the "right" LA i.e. received by the "right" MSC/VLR. LA identity is stored in the UE for enabling originating call in the LA to be received by the MSC/VLR controlling said LA. To Update the stored LA identity, the MSC/VLR is adapted to respond with a suitable LA or set of LAs as a response to the registration in the VLR. This LA or set of LAs is provided to the UE. One alternative process is to use an adapted MME for providing the UE to the LA used in the registration. Further, one process is to perform a mapping between LTE format and CS format of UE position information in the MME, which mapping will result in the correct LA in VLR. The same result is achieved if the mapping transformation is performed by the MME or the MSC/VLR. The set of LAs consist of the LA where the UE is registered and a list of LAs controlled by the MSC/VLR where the UE is registered. The LA (set of LAs) can be used to find suitable GSM/WCDMA cells to access at originating and/or terminating calls.

If the UE is registered in a virtual LA while in LTE and the LA known in the UE, the nodes MME, eNode B and UE is adapted to communicate with each other in the system wherein the nodes are performing the following steps:

When registering in LTE the MME maps the current LTE cell and/or the TA to an LA and a proper MSC/VLR. The MME registers the UE in the MSC/VLR. As a response to the registration in MSC/VLR the MME will be provided with a set of one or more LAs. The set of LAs consist of the LA where the UE is registered and a list of LAs controlled by the MSC/VLR where the UE is registered. This set of one or more LAs will be provided to the UE. Whenever a TA Update result in a new LA or a new MME being accessed the MME re-registers the UE in the MSC/VLR. The MME will also perform periodic registrations towards the VLR. The periodic registrations can be triggered either by the periodic TA Updates, if the periodic TA update timer is aligned with the periodic LA Update timer required by the MSC/VLR, or by the MME itself. The latter is suitable both for the LTE_Active state, where no TA Update is performed, and the LTE_Idle state, (to decouple the periodic TA Update timer from the periodic LA Update timer. The MME will inform the UE whenever the LA it registered the UE in or the list of LAs controlled by the MSC/VLR has changed.

A virtual LA is created by means of mapping from LTE cell and/or TA to LA.

2) The UE is Responsible for the LA Update.

2.1 UE Registered for CS in MSC/VLR or VLR.

The UE is adapted to generate and send LA Update in both LTE_Idle and LTE_Active. Alternative registration procedures are discussed in the following, se sections 2.1.a and 2.1.b.

2.1.a) The UE sends the LA Update in LTE based on LA info received from the eNode B or read from broadcast in LTE. In the first step, LA Update is routed to the MSC/VLR as for the Gs interface in GPRS. In the next step, the MSC/VLR responds with a suitable LA or set of LAs as a response to the registration in the MSC/VLR. This LA or set of LAs is provided to the UE;

2.1.b) The UE the sends LA Update in LTE based on LA read from broadcast in GSM or WCDMA.

In the first step, LA Update is routed to the MSC/VLR as for the Gs interface in GPRS. In the next step, the MSC/VLR responds with a suitable LA or set of LAs as a response to the registration in the MSC/VLR. This LA or set of LAs is provided to the UE. The LA or set of LAs can be used to find suitable GSM/WCDMA cells to access at originating and/or terminating calls.

2.2 Periodic LA Update

Alternative registration procedures are discussed in the following, se sections 2.2.a and 2.2.b.

2.2.a) The UE sends the LA Update in LTE based on the timer for periodic LA Update received from the eNode B, in the LA Update Response, or read from broadcast in LTE. In the next step, LA Update is routed to the MSC/VLR as for the Gs interface in GPRS; or 2.2.b) The UE sends the LA Update in LTE (based on the timer for periodic LA Update read from broadcast in GSM or WCDMA. In the next step, LA Update is routed to the MSC/VLR as for the Gs interface in GPRS.

Note that the LA Update could be separate signaling or combined with TA Update, i.e. a combined LA/TA Update.

If the UE is registered in a LA, the nodes UE, MME, MSC/VLR and eNode B in the system is adapted to communicate with each other performing following steps:

When moving into LTE coverage, the UE always performs an LA Update. This action could be excluded if the MME and SGSN are implemented as a common node;

While in LTE, the UE reads the broadcast information from broadcast channel either in LTE or in GSM/WCDMA during idle times/gaps, among other information even the LA identity;

In LTE_Active the UE may receive the LA information as dedicated information provided by network as a complement to or instead of reading the broadcast information;

While in LTE, the UE will perform periodic LA Updates as well as LA Updates when the LA is received from the network, for example as broadcast or dedicated information, is different from the one that the UE is registered in;

An LA Update in LTE, which is initiated by the UE, will result in the MME registering the UE in the MSC/VLR, at least when the UE accesses a new MME. This will enable the MSC/VLR to request paging of the UE from the proper MME. As a response to the LA Update the UE will be provided with a set of one or more LAs. The set of LAs consist of the LA where the UE is registered and a list of LAs controlled by the MSC/VLR where the UE is registered.

The eNode B is adapted to receive triggers/trigger signals and, as a response to said triggers, to send LA information to an individual UE.

In LTE_Idle, when receiving TA Update, the eNode B is adapted to send relevant LA information, e.g. LA Identity as part of the TA Update response. Alternatively, the eNode B is adapted to send relevant LA information as a dedicated message.

Also in LTE_Active, the eNode B is adapted to receive triggers/trigger signals and, as a response to said triggers, send LA information to an individual UE.

One such trigger is Configuration, i.e. as soon as the LA information of the current cell is different from the one previously sent to the UE the LA information is sent to the UE If no LA information has been sent previously the LA information is sent as soon as the UE enters LTE_Active state.

Another trigger is the UE measurement reports received. Further one trigger is when a new eNode B measurement result is provided.

The eNode B is adapted to send relevant LA information concatenated with another message sent to the UE or as a dedicated message.

Hereafter the enabling method will described for terminating and originating calls, respectively.

How to Place and Receiving a Call i.e. Terminating Call

Figure 13:
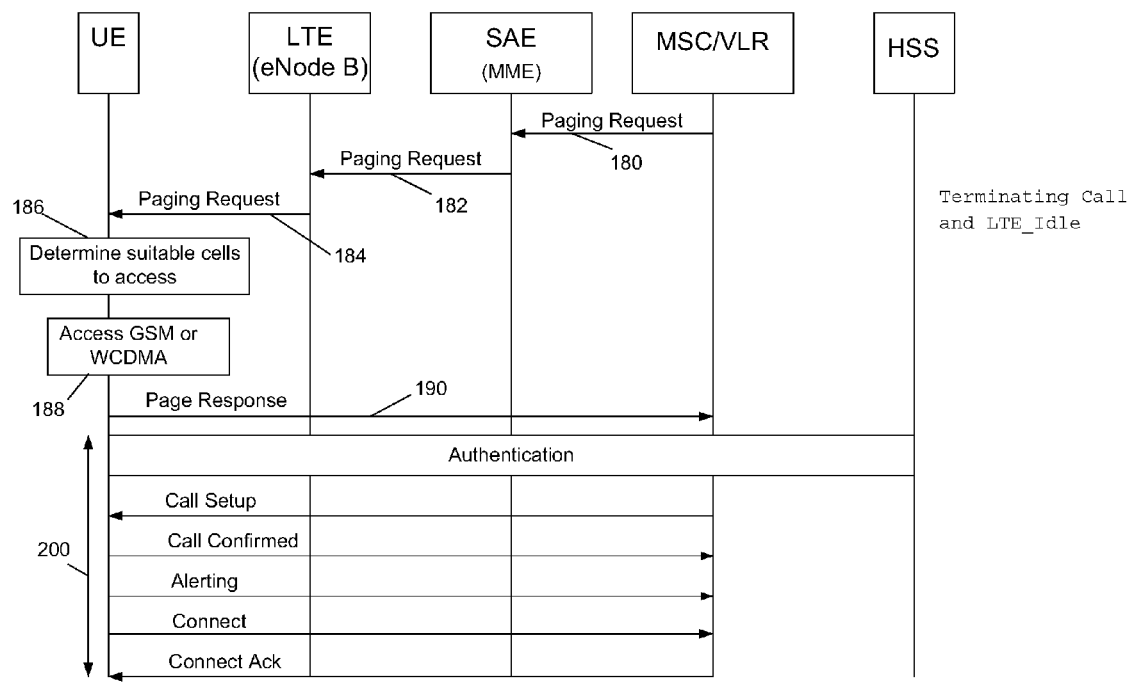
FIG. 13 is a flowchart illustrating different embodiments of the invention for receiving a call in LTE_Idle.

With reference to FIG. 13, different embodiments of the invention for receiving a call in LTE_Idle state will be described.

When the MSC/VLR receives a call to be distributed to a UE camping in a cell controlled by said MSC, the MSC interrogates the VLR for the LA where the UE is registered. If the UE is registered as controlled by an MME in MSC/VLR, the MSC/VLR generates a page request message and sends said message to the indicated MME, step 180. The Page Request message comprises information about UE identity, e.g. the IMSI code, and information about the Suitable LAs, i.e. the LA and/or the set of LAs, where the UE shall respond to the paging request shall be sent. The set of LAs consist of the LA where the UE is registered and/or a list of LAs controlled by the MSC/VLR where the UE is registered.

The MME receives the page and, in LTE_Idle, generates a Paging Request message comprising information about the TA (Tracking Area) where the UE is registered, and providing the Suitable LAs information. In step 182, said Paging Request is sent by the MME as a Paging Request to all the eNode Bs of the indicated TA. Said Paging Request may also involve S-TMSI code.

In, step 184, the Page Paging Request messages are transmitted by the eNode Bs in all of the eNode B cells belonging to the TA. The Paging Request may either contain the page for a CS call or a page to enable the UE to change to LTE_Active. In the latter case the eNode B continues by sending a Paging Request message for the CS call as a dedicated message when the UE has changed to LTE_Active.

The paging request (paging the UE for the CS call) may also include additional information that helps the UE to select the proper GSM/WCDMA cell faster. The information may be provided by the MSC/VLR in the page request sent to the MME or by the MME in the page paging request to the eNode B, or by the eNode B in the "Page Paging Request" to the UE. Example on information that may speed up the access is:

in GSM: frequency, BSIC, and control channel combination in WCDMA: frequency, primary scrambling code, PRACH info, Configuration of the physical RACH (Random Access Channel) and access restrictions. PRACH is a Configuration of the Physical RACH (Random Access Channel).

When the UE has recognized the Paging Request for the CS call, the UE determines the suitable cells to access, step 186.

In step 186, the UE uses the received Suitable LAs information (LAs) to derive a subset of suitable GSM/WCDMA cells. In the LTE_Idle state, a number of alternative methods are available for generating said subset of cells.

A first embodiment of the method to derive a subset of GSM/WCDMA cells is that the UE is adapted to read and use the list of neighbouring GSM/WCDMA cells read from a broadcast channel in LTE to find a suitable GSM or WCDMA cell. Said GSM/WCDMA cells that belong to the LA and/or set of LAs indicated in the page from the MME via the eNode B or received at registration, e.g. LA Update are included in the set of suitable GSM/WCDMA cells. The UE uses said set of suitable GSM/WCDMA cells to find a GSM or WCDMA cell that it can access.

A second method to derive a subset of suitable GSM/WCDMA cells is possible when the eNode B provides a list of relevant neighbouring GSM and/or WCDMA cells by dedicated signalling. Said GSM/WCDMA cells that belong to the LA and/or set of LAs indicated in the page from the MME via the eNode B or received at registration, e.g. LA Update are included in the set of suitable GSM/WCDMA cells. The UE uses said set of suitable GSM/WCDMA cells to find a GSM or WCDMA cell that it can access. Dedicated signaling from the eNode B would typically be used in the LTE_Active state, but could also be applied in LTE_Idle state.

Further, a third method to derive a subset of GSM/WCDMA cells is that the UE is adapted to use idle times, which are created by the DRX feature of the LTE_Idle state to read system information from GSM and/or WCDMA network to get information on which LA a certain GSM/WCDMA cell belongs to. This information is used to create a list of relevant neighbouring GSM and/or WCDMA cells, which list indicates where the UE is allowed to respond to the page. Said GSM/WCDMA cells that belong to the LA and/or set of LAs indicated in the page from the MME via the eNode B or received at registration, e.g. LA Update, are included in the set of suitable GSM/WCDMA cells. The UE uses said set of suitable GSM/WCDMA cells to find a suitable GSM or WCDMA cell that it can access.

The UE is adapted to decide by means of the neighbouring cell information received from the LTE system from which cells the system information should be read.

An alternative embodiment of a method for receiving a call in LTE_Idle state will now be described. The MSC/VLR does not provide any LA or set of LAs indicating from where the UE shall respond to the page request. The paging request sent from the MSC/VLR, step 180 in FIG. 13, will therefore not include said LA information.

In this case, the UE is adapted to use, in step 186, the LA to which it is registered and/or the list of LAs controlled by the MSC/VLR received at registration, e.g. LA Update, to derive a subset of GSM/WCDMA cells to access.

The described first alternative method to derive a subset of GSM/WCDMA cells is applicable. The UE uses the list of neighbouring GSM/WCDMA cells read from a broadcast channel in LTE in to find a suitable GSM or WCDMA cell. Said GSM/WCDMA cells belong to the LA and/or set of LAs indicated in the page from the MME via the eNode B or received at registration are included in the set of suitable GSM/WCDMA cells. The UE uses said set of suitable GSM/WCDMA cells to find a GSM or WCDMA cell that it can access.

Further, the above described method of deriving a subset of GSM/WCDMA cells is that the UE uses idle times, which are created by the DRX feature of the LTE_Idle state to read system information from GSM and/or WCDMA network to get information on which LA a certain GSM/WCDMA cell belongs to. DRX means "Discontinuous Reception" and the UE will be listening for pages in the cell where it is camping. In LTE Idle a DRX period is pre-set. This information is used to create a list of relevant neighbouring GSM and/or WCDMA cells from where UE shall respond to the page. Said GSM/WCDMA cells that belong to the LA and/or set of LAs indicated in the page from the MME via the eNode B or received at registration, are included in the set of suitable GSM/WCDMA cells. The UE uses said set of suitable GSM/WCDMA cells to find a GSM or WCDMA cell that it can access.

Further one method to derive GSM or WCDMA cells is to use the list of Suitable GSM or WCDMA cells distributed as a part of the LA Update process. The UE is adapted to receive and store said list in one of its memories.

Said information is used to access a proper GSM/WCDMA cell for sending the response to the page request.

If the UE cannot reach any of the neighboring cells derived according to above, the UE is adapted to attempt to access any GSM/WCDMA cell either within the same LA or set of LAs as the UE received the page request, if such a request has been received. Alternatively, the UE is adapted to attempt to access any GSM/WCDMA cell within the LA or LAs, wherein the UE is registered, or the LA listed in the list of LAs controlled by the MSC/VLR.

If the UE cannot reach any cell derived according to above, the UE is adapted to attempt to access any GSM/WCDMA cell, in step 188, in an attempt to respond to the page request.

The methods described to determine suitable GSM/WCDMA cells to access in the paragraphs above can be used together to create a list of cells that the UE will attempt to access. Even though described so above, the UE does not have to perform the above actions in sequence. More parallelism can also be applied.

In step 188, the derived information about suitable cells from step 186 is used to access a GSM/WCDMA cell for sending the response to the page request.

The UE is adapted to send a Page Response message, step 190, via the 2G/3G RAN to the MSC/VLR. The standard procedure 200 for connecting a terminating call continues, step 200, but said procedure is considered to be known by a skilled person in the art, and the procedure will therefore not be described.

When accessing GSM/WCDMA to respond to the page request the UE can do that in any of the following ways a)-d):
a) by performing a cell re-selection establishing the Packet-Switched (PS) connection with the PS domain to preserve any active PS connection and then responding to the page request towards the Circuit Switched (CS) domain; or
b) by responding to the page request (towards the CS domain) and then establishing the PS connection with the PS domain to preserve any active PS connection; or
c) by responding to the page request towards the CS domain and establishing the PS connection with the PS domain to preserve any active PS connection in parallel; or
d) by responding to the page request (towards the CS domain).

Figure 14:
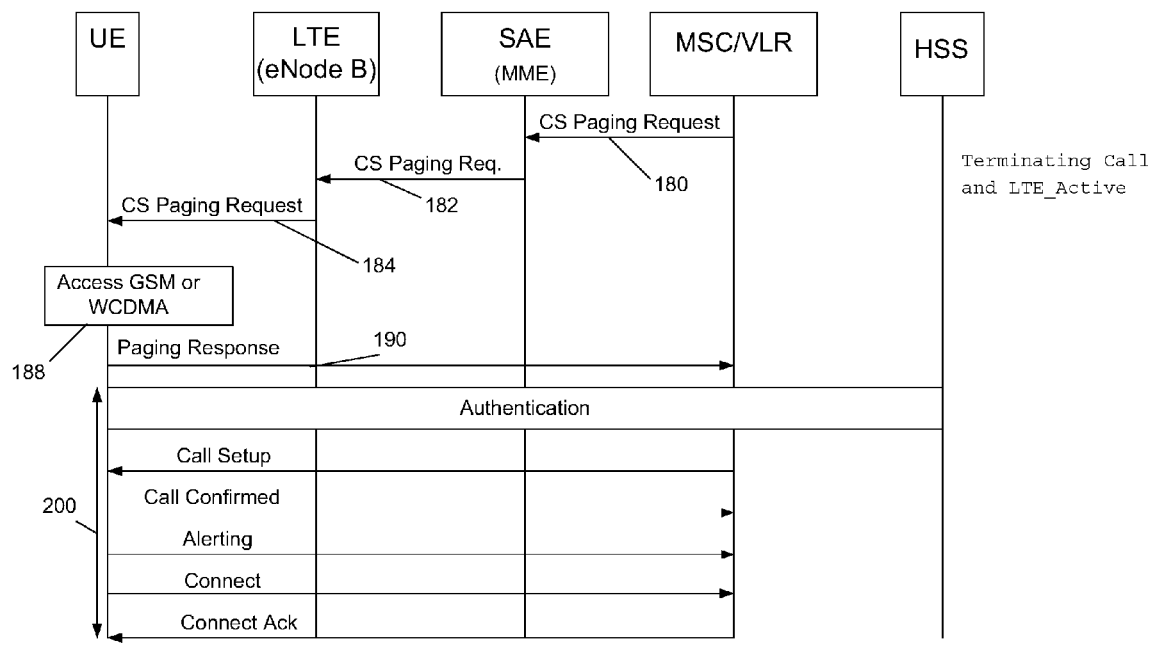
FIG. 14 is a flowchart illustrating different embodiments of the invention for receiving a call in LTE_Active.

With reference to FIG. 14, different embodiments of methods for receiving a call in LTE_Active state will be described. In LTE_Active state, a connection with the UE is already established in the LTE network. In LTE_Idle such a connection is not established.

Any ongoing PS Session can be maintained by performing RA Update and Service Request in GSM/WCDMA either
a) Before sending Page Response;
b) In parallel with the call establishment;
c) After the call establishment.

RA Update has to be performed for mobility management reasons e.g. before, in parallel with, or after call establishment.

When the MSC/VLR receives a call to be distributed to a UE camping in a cell controlled by said MSC, the MSC interrogates the VLR for the LA where the UE is registered. If the UE is registered as controlled by an MME in VLR, the MSC generates a page request message and sends said message to the indicated MME, step 180. The Page Request message comprises UE identity, e.g. the IMSI code, and information about the Suitable LAs, i.e. the LA and/or the set of LAs, where the UE shall respond to the paging request shall be sent. The set of LAs consist of the LA where the UE is registered and/or a list of LAs controlled by the MSC/VLR where the UE is registered.

The MME receives the page request and, in LTE_Active, generates a Circuit Switched (CS) Paging Request message comprising information about the Suitable LAs (Location Areas). In step 182, said CS Paging Request is sent by the MME as a dedicated message to the eNode B where the UE is connected. The CS Paging Request is sent to the eNode B using an S1 connection. The eNode B receives the CS Paging Request and generates a CS Paging Request message, to be sent to the UE, comprising information about the Suitable LAs (Location Areas). Said CS Paging Request is a dedicated paging message sent to the UE, i.e. a message sent using the connection with the UE.

In one embodiment, the sent paging message indicates in which LA or set of LAs the UE shall respond to the page request in order for the page response to be routed to the right MSC/VLR. In another embodiment, the sent paging message does not indicate in which LA or set of LAs where the UE shall respond to the page. In this embodiment the UE instead uses the LA or set of Las received by the UE during registration e.g. LA Update. The set of LAs consists of the LA where the UE is registered and a list of LAs controlled by the MSC/VLR where the UE is registered.

The paging request may also include additional information that helps the UE to select the proper GSM/WCDMA cell faster. The information may be provided by the MSC/VLR in the page request sent to the MME or by the MME in the page request to the eNode B, or by the eNode B in the "Page Request" to the UE. Example on information that may speed up the access is: in GSM: frequency, BSIC, and control channel combination in WCDMA: frequency, primary scrambling code, PRACH info, Configuration of the physical RACH (Random Access Channel) and access restrictions. PRACH is a Configuration of the Physical RACH (Random Access Channel).

In, step 184, the CS Page Request message is transmitted by the eNode B of the UE. The message is sent using the RRC (Radio Resource Control) connection.

When the UE has received the Paging Request, the UE determines the suitable cells to access, step 186.

In step 186, the UE uses the received LA information (LAs) to derive a subset of GSM/WCDMA suitable cells. In the LTE_Idle state, a number of alternative methods are available for generating said subset of cells, which now will be described:

A first method in LTE_Active to derive a subset of GSM/WCDMA cells is possible when the eNode B provides a list of relevant neighbouring GSM and/or WCDMA cells. Said neighbouring GSM/WCDMA cells belonging to the LA and/or set of LAs indicated in the page from the MME via the eNode B or received at registration, e.g. LA Update are included in the set of suitable GSM/WCDMA cells. The UE uses said set of suitable GSM/WCDMA cells to find a GSM or WCDMA cell that it can access.

A second method of deriving a subset of GSM/WCDMA cells is possible when the eNode B provides a list of relevant neighbouring GSM and/or WCDMA cells in the broadcast channel. Said neighbouring GSM/WCDMA cells that belong to the LA and/or set of LAs indicated in the page from the MME via the eNode B or received at registration, e.g. LA Update, are included in the set of suitable GSM/WCDMA cells. The UE uses said set of suitable GSM/WCDMA cells to find a GSM or WCDMA cell that it can access.

Further, a third method of deriving a subset of GSM/WCDMA cells is that the UE is adapted to use scheduled time gaps created by the eNode B to read system information from GSM and/or WCDMA network to get information on which LA a certain GSM/WCDMA cell belongs to. The information is also possible to get from neighboring cell info received as a part of RRC (Radio Resource Control) measurement procedures. The information is used to create a list of relevant neighbouring GSM and/or WCDMA cells from where UE shall respond to the page. The neighbouring GSM/WCDMA cells that belong to the LA and/or set of LAs indicated in the page from the MME via the eNode B or received at registration, e.g. LA Update, are included in the set of suitable GSM/WCDMA cells. The UE uses said set of suitable GSM/WCDMA cells to find a GSM or WCDMA cell that it can access.

If the UE cannot reach any of the neighboring cells derived according to above, the UE is adapted to attempt to access any GSM/WCDMA cell either within the same LA or set of LAs as the UE received the page request, if such a request has been received. Alternatively, the UE is adapted to attempt to access any GSM/WCDMA cell within the LA or LAs, wherein the UE is registered, or the LA listed in the list of LAs controlled by the MSC/VLR.

If the UE cannot reach any cell derived according to above, the UE is adapted to attempt to access any GSM/WCDMA cell, in step 188 in an attempt to respond to the page request.

The methods described to determine suitable GSM/WCDMA cells to access in the paragraphs above can be used together to create a list of cells that the UE will attempt to access. Even though described so above, the UE does not have to perform the above actions in sequence. More parallelism can also be applied.

In step 188, the derived information about suitable cells from step 186 is used to access a GSM/WCDMA cell for sending the response to the page request.

The UE is adapted to send a Page Response message, step 190, via the 2G/3G RAN to the MSC/VLR. The standard procedure 200 for connecting a terminating call continues, step 200, but said procedure is not of certain interest for the present invention.

When accessing GSM/WCDMA to respond to the page request the UE can do that in any of the following ways a), b), c) or d):

a) by performing a cell re-selection establishing the PS connection with the PS domain to preserve any active PS connection and then responding to the page request towards the CS domain; or
b) by responding to the page request (towards the CS domain) and then establishing the PS connection with the PS domain to preserve any active PS connection; or
c) by responding to the page request (towards the CS domain) and establishing the PS connection with the PS domain to preserve any active PS connection in parallel; or
d) by responding to the page request towards the CS domain.

Method for Placing an Outgoing Call

Figure 15:
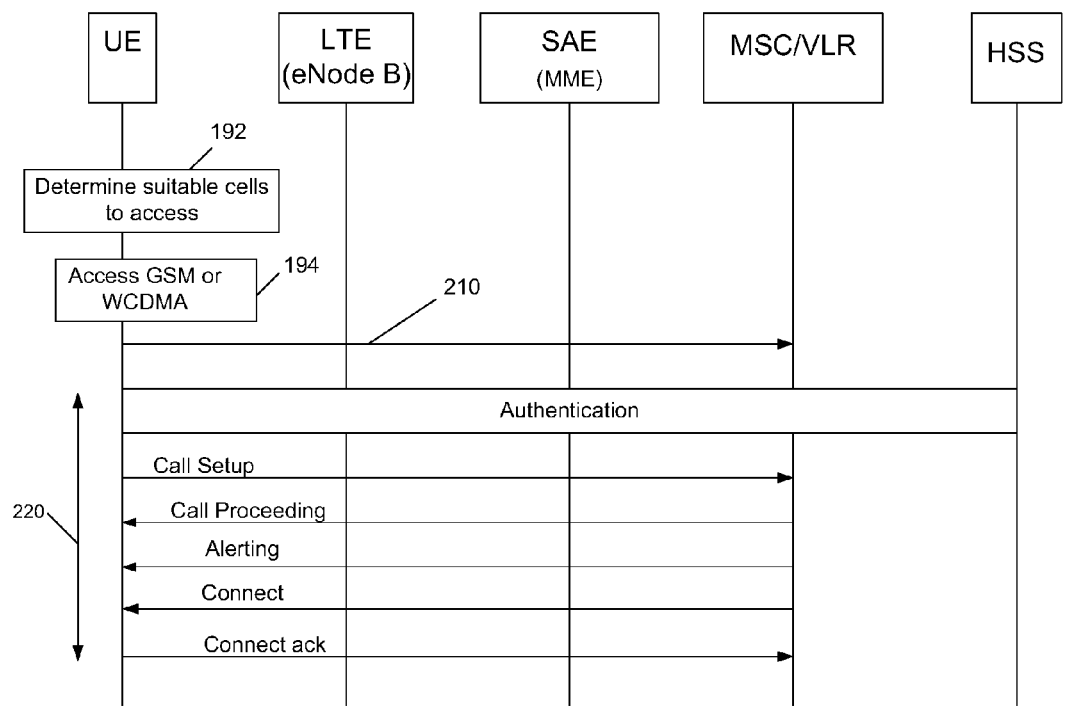
FIG. 15 is a flowchart illustrating embodiments of the invention for initiating a call.

With reference to FIG. 15, embodiments of the invention for initiating a call will now be described. Said embodiments are directed to registering to the CS Domain when initiating a call. The state may be either of LTE_Active or LTE_Idle.

When a user initiate a call, the UE is adapted to determine suitable cells, step 192, while not being connected to the CS domain. For this purpose, the UE has to receive information regarding which GSM/CDMA cells to access. Alternative embodiments of procedures of determining suitable cells of a GSM/CDMA network to access is provided in accordance with the invention.

In a first embodiment of said method, the UE is adapted to read Suitable LAs received as a part of LA update. The GSM/WCDMA cells that belonging to the an LA included in the Suitable LAs are included in the set of suitable GSM/WCDMA cells. The UE uses said set of suitable GSM/WCDMA cells to find a GSM or WCDMA cell that it can access.

In a second embodiment of said method, the UE is adapted to read and use a list of neighbouring GSM/WCDMA cells provided by a broadcast channel provided from the network controlling the cell or provided as dedicated signalling from the network. Said GSM/WCDMA cells listed in the broadcast channel that belong to the LA, to which the UE is registered, and/or the list of LAs controlled by the MSC/VLR are included in the set of suitable GSM/WCDMA cells. The UE uses said set of suitable GSM/WCDMA cells to find a GSM or WCDMA cell that it can access.

Further, a third method of deriving a subset of suitable GSM/WCDMA cells is that the UE is adapted to use scheduled time gaps created by the eNode B to read system information from GSM and/or WCDMA network to get information on which LA a certain GSM/WCDMA cell belongs to. The information is also possible to get from neighbouring cell info received as a part of RRC (Radio Resource Control) measurement procedures. The information is used to create a list of relevant neighbouring GSM and/or WCDMA cells from where UE shall respond to the page. Said GSM/WCDMA cells that belong to the LA and/or set of LAs indicated in the page from the MME via the eNode B or received at registration, e.g. LA Update, are included in the set of suitable GSM/WCDMA cells. The UE uses said set of suitable GSM/WCDMA cells to find a GSM or WCDMA cell that it can access.

At originating calls the UE would use the LA, or LAs if multiple LAs are allowed, where the UE is registered and the list of LAs controlled by the MSC/VLR to derive a subset of GSM/WCDMA cells from neighbouring cells received in broadcast in LTE or by dedicated signaling from the eNode B or from a list of cells it can receive created by reading system information from GSM and/or WCDMA during idle times/gaps. This information is used to access a proper GSM/WCDMA cell for initiating the call. Dedicated signaling would typically be used in the LTE_Active state, but could also be applied in LTE_Idle state.

Alternatively, if the UE cannot reach any of the neighboring cells derived according to above, it will attempt to access any GSM/WCDMA cell within the LA, or LAs if multiple LAs are allowed. it is registered in and the list of LAs controlled by the MSC/VLR order to initiate the call.

The UE is adapted to select any GSM or WCDMA cell in the LA that the UE is registered in and the list of LAs controlled by the MSC/VLR.

Finally, if none of the above succeeds, the UE will attempt to access any GSM/WCDMA cell in an attempt to initiate the call.

When accessing GSM/WCDMA to initiate the call the UE can do that in any of the following ways a), b), c), and d):

a) by performing a cell re-selection establishing the PS connection with the PS domain to preserve any active PS connection and then initiating the call towards the CS domain; or
b) by initiating the call towards the CS domain and then establishing the PS connection with the PS domain to preserve any active PS connection; or
c) by initiating the call towards the CS domain and establishing the PS connection with the PS domain to preserve any active PS connection) in parallel; or
d) be used together to create a list of cells that the UE will attempt to access.

I.e., even though described so above, the UE does not have to the above actions in sequence. More parallelism can also be applied.

The UE is adapted to send a CM Service Request message, step 210, via the 2G/3G RAN to the MSC/VLR. The standard procedure 220 for connecting an originating call continues, step 220, but said procedure will not be described in more detail.

Above, different embodiments of the method according to the invention have been discussed and presented in detail. Said embodiments are adapted for a radio communication system, comprising a Circuit-Switched network, an LTE network and an SAE Network. Certain nodes in the radio communication system are therefore modified for implementing said embodiments of the method for enabling access to CS Services in the radio communication system. The radio communication system presented in FIGS. 7-15 comprises:

Mobility Management Entity (MME) nodes in the SAE network;

Mobile Service switching Center (MSC)/Visitor Location Register (VLR) nodes (300 in the CS network;

eNode B nodes in the LTE network.

Further, the User Equipments UEs registered in the LTE system are considered as nodes.

Figure 16:
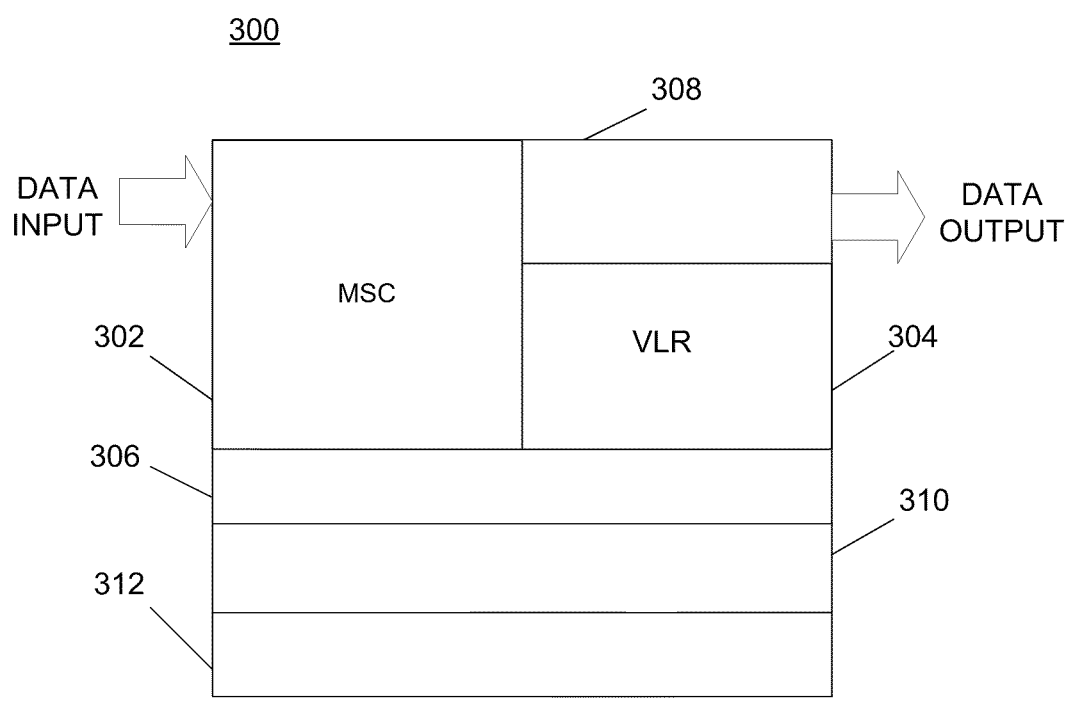
FIG. 16 is a block diagram schematically illustrating a radio communication system node comprising MSC/VLR according to the invention.

Further one node of the communication system is the Mobile Service Switching Centre (MSC) and Visitor Location Register (VLR) node, which is a node in the Circuit Switched (CS) network. An MSC/VLR has been described in connection with the systems in FIGS. 1 and 2, respectively, wherein the MSC/VLR has reference number 14. One embodiment of a MSC/VLR 300 (14 in FIG. 2) is schematically illustrated as a block diagram in FIG. 16. The MSC entity and VLR entity are illustrated as a MSC module 302 and a VLR module 304, respectively. Even though the MSC and the VLR are illustrated as separate modules, they may as well be considered as one module and entity. The MSC/VLR is adapted to communicate with different entities and networks, and it is therefore provided with data input means for receiving data information and data output means for sending data information.

According to one embodiment of a MSC/VLR according to the invention, said MSC/VLR is provided with means 306 for registering a User Equipment (UE) along with information regarding a Mobile Managing Entity (MME) controlling the UE, which UE and MME are located in a Packet Switched domain comprising at least a System Architecture Evolution (SAE) network. Further, the MSC/VLR is provided with means 308 for generating and sending a page request to the a MME when receiving a CS call for the UE.

According to yet another embodiment of the MSC/VLR according to the invention, said MSC/VLR is provided with means 308 for generating and sending the page request, which are arranged to include information regarding at least one Location Area LA in which it is desired to receive a page request response from the UE.

Further, in one embodiment of the MSC/VLR 300 node, said MSC/VLR comprises processing means 310 for transforming the UE's position in LTE format to position information in CS format. The MSC/VLR is therefore provided with means 312 for storing a mapping table for transforming the UE's position in LTE format to position information in CS format, said mapping table being used by the processing means for transforming the UE's position in LTE format to position information in CS format.

Figure 17:
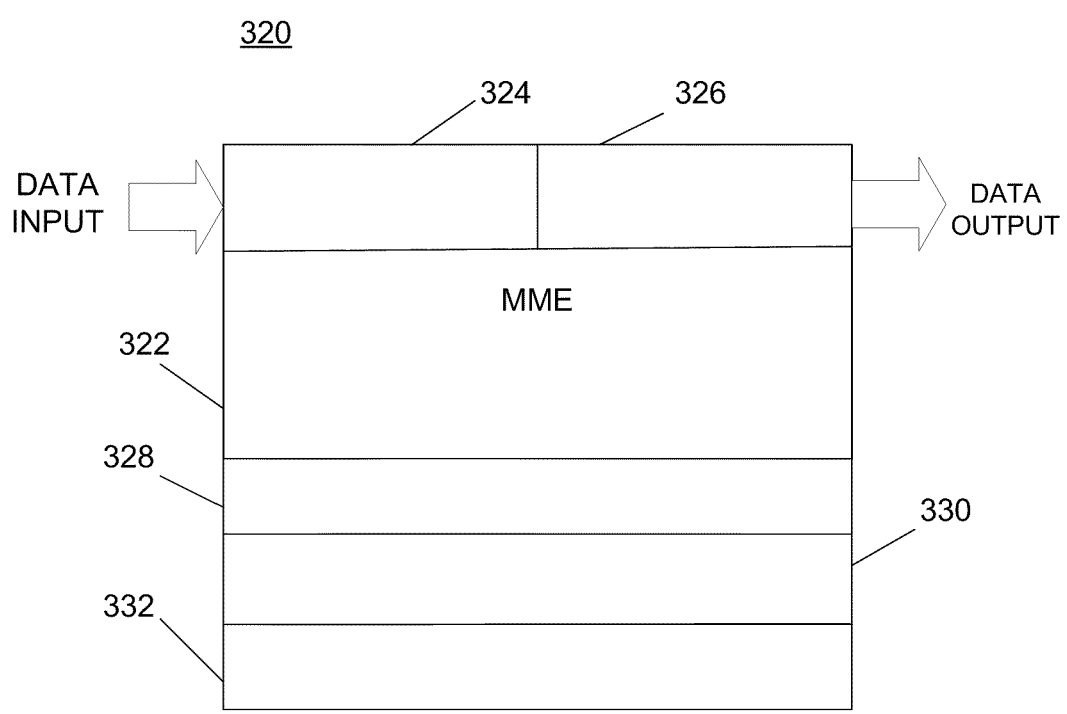
FIG. 17 is a block diagram schematically illustrating a radio communication system node comprising a Mobility Management Entity according to the invention.
Figure 18:
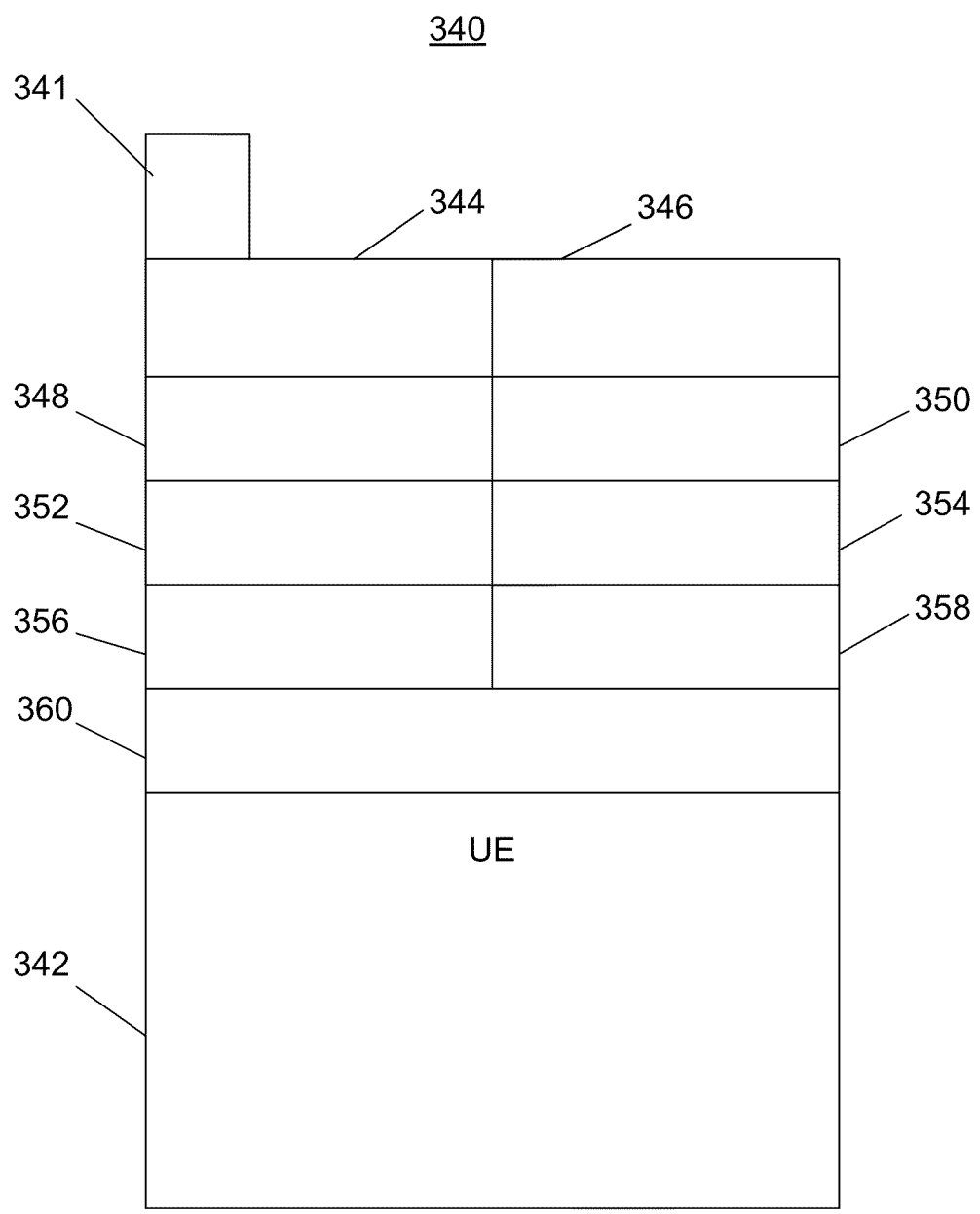
FIG. 18 is a block diagram schematically illustrating a radio communication system node comprising an User Equipment according to the invention.

Further one node of the communication system is a Mobile Management Entity (MME) node 320 is situated in and connected to a System Architecture Evolution (SAE) network connected to a Long Term Evolution (LTE) network, which is illustrated in FIG. 17. An MME has been described in connection with the system in FIG. 2, wherein the MME has reference number 40.

The MME's ordinary functions and corresponding means are illustrated as a module 322. The MME is adapted to communicate with different entities and networks, and it is therefore provided with data input means for receiving data information and data output means for sending data information.

In one embodiment of the MME 320 comprises means 324 for receiving a paging request message from a CS network regarding an incoming CS call to a User Equipment (UE) connected to said LTE network, and means 326 for forwarding the paging request to the UE in the LTE network.

In one embodiment, the MME further comprises means 328 for storing the User Equipment's current position in the LTE network in a LTE position format and processing means 330 for transforming the UE's position in LTE format to position information in a CS format. The MME further comprises means 332 for storing a mapping table for transforming the UE's position in the LTE format to position information in the CS format, and wherein said processing means are arranged to use the mapping table for transforming the UE's position in the LTE format to position information in the CS format.

A User Equipment (UE) 340 for use in a radio communication system, is considered to be a node of the system. A User Equipment may comprise a lot of different means for facilitating the UE to perform well-known functions beside the present invention. Said function means are gathered in a common block, which is denoted UE module 342. The UE is equipped with an antenna 341 for communicating on radio-frequency electromagnetic waves over the air interface with the radio antennas of the Radio Base Stations.

In one embodiment of said UE, it is provided with means 344 for communicating with a Packet Switched Long Term Evolution (LTE) network and System Architecture Evolution (SAE) network and means 346 for communicating with a Circuit Switched (CS) network. The UE further may comprise means 348 for connecting to the CS network, means 350 for receiving an incoming Circuit-switched (CS) call, which comprises means 352 for receiving a paging request regarding said incoming CS call from the CS network via said LTE network and SAE network, and means 354 for responding to the paging request in the CS network.

The UE may also comprise means 356 for extracting Location Area (LA) information from the paging request, which LA information is indicating at least one Location Area (LA) in the CS network from which the UE is allowed respond to the page request. The UE further comprises means 358 for receiving a registration response message from the CS network, which registration response message includes information indicating at least one Location Area (LA) in the CS network from which the UE is allowed to respond to the page request.

The UE further may comprise means 360 for initiating an outgoing Circuit-switched (CS) call while being connected to the LTE network and SAE network.

Figure 19:
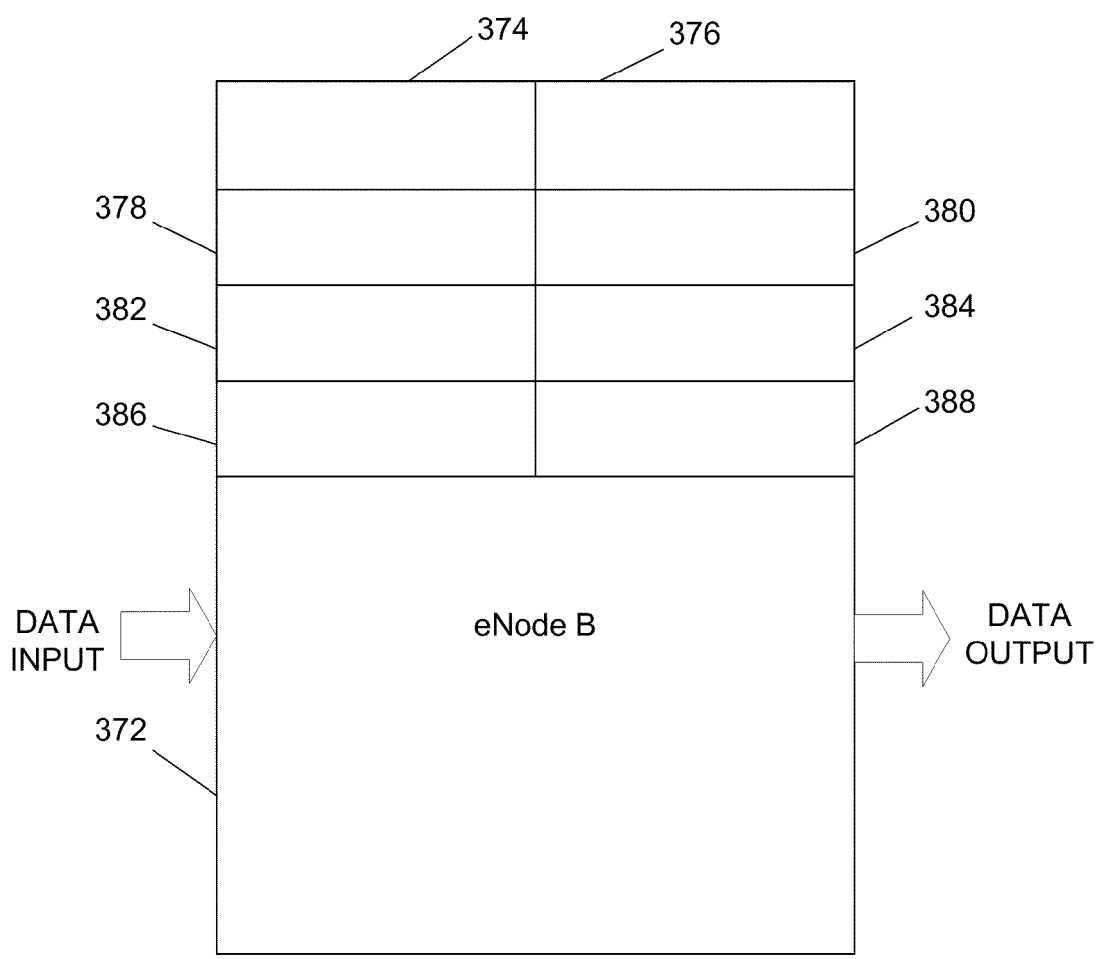
FIG. 19 is a block diagram schematically illustrating a radio communication system node comprising an eNode B according to the invention.

Finally, embodiments of a eNode B node 370 according to the invention will be described. ENode B is situated in and connected to a Long Term Evolution (LTE) network, which is connected to a System Architecture Evolution (SAE) network, which is illustrated in FIG. 19. An eNode B has been described in connection with the system in FIG. 2, wherein the eNode B has reference number 27.

The eNode B's ordinary functions and corresponding means are illustrated as a module 372. The eNode B is adapted to communicate with different entities and networks, and it is therefore provided with data input means for receiving data information and data output means for sending data information.

An eNode B 370 according to an embodiment of the invention comprises means 372 for receiving a paging request message regarding an incoming CS call to a User Equipment (UE) connected to said LTE network, and means 374 for forwarding the paging request to the UE in the LTE network. Further, the eNode B may comprise means 376 for storing the User Equipment's current position in the LTE network in a LTE position format and processing means 378 for transforming the UE's position in LTE format to position information in a CS format. Said transforming is made possible by means 380 for storing a mapping table for transforming the UE's position in the LTE format to position information in the CS format, and wherein said processing means 378 are arranged to use the mapping table for transforming the UE's position in the LTE format to position information in the CS format.

In further embodiments of the eNode B, said node is provided with means 382 for including LA information in broadcast information, which is transmitted in a broadcast channel from eNode B.

In one embodiment of the eNode B, said node is provided with means 384 for including in a paging request additional information that that helps the UE to accelerate the selection of an GSM/WCDMA cell.

In further embodiments, the eNode B may comprise means 384 for receiving triggers and/or trigger signals, and means 388 for sending LA information to an individual UE as a response to said triggers.

In LTE_Idle, when receiving TA Update, the eNode B is adapted to send relevant LA information, e.g. LA Identity as part of the TA Update response. Alternatively, the eNode B is adapted to send relevant LA information as a dedicated message.

Also in LTE_Active, the eNode B is adapted to receive triggers/trigger signals and, as a response to said triggers, send LA information to an individual UE.

One such trigger is Configuration, i.e. as soon as the LA information of the current cell is different from the one previously sent to the UE the LA information is sent to the UE If no LA information has been sent previously the LA information is sent as soon as the UE enters LTE_Active state.

Another trigger is the UE measurement reports received. Further, one trigger is the reception of an eNode B measurement. Also, one trigger is generated when the eNode B sends relevant LA information concatenated with another message sent to the UE or as a dedicated message.

Different embodiments of the invention have been described above. Said embodiments may be implemented in many ways, such as software program instructions for processing means, such as microprocessors, computers, CPU (Computer Processing Unit), etc. The invention may also be implemented as hardware or firmware, or a combination of at least two of said examples.

The present invention may be embodied in many different forms and should not be construed as limited to the embodiments set forth herein; rather, these embodiments are provided so that this disclosure will be thorough and complete, and will fully support the enclosed set of claims.

The invention claimed is:

1. A Mobile Managing Entity (MME) for use in a System Architecture Evolution (SAE) network connected to a Long Term Evolution (LTE) network, the MME comprising:
  a processor configured to:
    receive a paging request message from a circuit-switched (CS) network regarding an incoming CS call to a User Equipment (UE) in the LTE network, wherein a radio access technology of the CS network is different from a radio access technology of the LTE network;
    forward the paging request to the UE in the LTE network;
    store a mapping table for transforming the UE's position in the LTE format to position information in the CS format; and
    use the mapping table to transform the UE's position in the LTE format to position information in the CS format.

2. The MME according to claim 1, wherein the processor is further configured to:
  register the UE in the CS network.

3. An eNode B for use in a Long Term Evolution (LTE) network connected to a System Architecture Evolution (SAE) network, the eNode B comprising:
  a processor configured to:
    receive a paging request message regarding an incoming Circuit Switched (CS) call to a User Equipment (UE) in the LTE network, where the CS call is provided by a CS network with a radio access technology that is different from a radio access technology of the LTE,
    store a mapping table for transforming the UE's position in the LTE format to position information in the CS format; and
    use the mapping table to transform the UE's position in the LTE format to position information in the CS format; and
    forward the paging request to the UE in the LTE network.

4. The eNode B according to claim 3, wherein the processor is further configured to:
  register the UE in the CS network.

5. The eNode B according to claim 3, wherein the processor is further configured to:
  include Location Area (LA) information in broadcast information, the broadcast information being transmitted in a broadcast channel from eNode B.

6. The eNode B according to claim 3, wherein the processor is further configured to:
  include in a paging request additional information that helps the UE to accelerate selection of a Global System for Mobile Communications/Wideband Code Division Multiple Access (GSM/WCDMA) cell.

7. A method for enabling access for a User Equipment (UE) to Circuit-switched (CS) services provided by a CS network while being in a Long Term Evolution (LTE) network and a System Architecture Evolution (SAE) network, the SAE network being part of a Packet-switched (PS) core network, where a current position of the UE is stored in a LTE position format in the LTE network or in the SAE network, where a Mobility Management Entity (MME) is responsible for a Location Area (LA) update process towards a Mobile Service switching Center/Visitor Location Register (MSC/VLR) node in the CS network for updating the UE's position in the CS network, the method comprising:
  transforming the current position of the UE in the LTE format to position information in CS format for the UE;
  registering the UE in the CS network using the transformed position information; and
  establishing access to the CS services provided by the CS network, and wherein the LA update process comprises one or more of:
    registering, via the MME, the UE identity in the MSC/VLR node during a Tracking Area (TA) update;
    registering, via the MME, the UE identity in the MSC/VLR node periodically based on a timer for periodic LA update; and registering, via the MME, the UE identity in the MSC/VLR node when a position update of type LTE_Active Mobility is performed.

8. The method according to claim 7, where the LTE position information used in the transforming is either LTE cell identity or Tracking Area (TA) identity, or a combination of the LTE cell identity and the TA identity.

9. The method according to claim 7, where the transforming is performed by a Mobility Management Entity (MME) node controlling the network which the UE is visiting.

10. The method according to claim 7, where the transforming is performed by a Mobile Service switching Center Visitor Location Register (MSC/VLR) node of the CS network in which the UE is visiting.

11. The method according to claim 7, where the transforming is performed by an eNode B node of the cell in which the UE is visiting.

12. The method according to claim 7, where the UE is responsible for a Location Area (LA) update process towards a Mobile Service switching Center Visitor Location Register (MSC/VLR) node in the CS network for updating the UE's position in the CS network,
where the MSC/VLR node controls a CS network cell where the UE is visiting, and
where the LA update process comprises:
sending, via the UE, LA update information to the MSC/VLR node via the LTE and SAE networks in which the UE is located.

13. The method according to claim 7, where the establishing access to CS services includes:
enabling the User Equipment (UE) to receive an incoming Circuit-switched (CS) call, the enabling comprising:
receiving, via the UE, a paging request regarding the incoming CS call from the CS network via the LTE network and the SAE network,
connecting, via the UE, to the CS network, and
responding, via the UE, to the paging request in the CS network.

14. The method according to claim 13, where the paging request includes information indicating at least one Location Area (LA) in the CS network from which the UE is allowed respond to the page request.

15. The method according to claim 7, where the establishing access to CS services includes:
enabling the User Equipment (UE) to initiate an outgoing Circuit-switched (CS) call while being in the LTE network and the SAE network, the enabling comprising:
connecting, via the UE, to the CS network, and
initiating, via the UE, the outgoing CS call in the CS network.

16. The MME of claim 1, wherein the UE is connected to the LTE network.

17. The eNode B of claim 3, wherein the UE is connected to the LTE network.

18. The method of claim 7, wherein the UE is connected to the LTE network and SAE networks.

19. The method of claim 12, wherein the UE is connected to the LTE and SAE networks.

20. The method of claim 15, wherein the UE is enabled to initiate an outgoing CS call while being connected to the LTE and SAE networks.

* * * * *

UNITED STATES PATENT AND TRADEMARK OFFICE
CERTIFICATE OF CORRECTION

PATENT NO.         : 9,036,568 B2
APPLICATION NO.    : 13/103150
DATED              : May 19, 2015
INVENTOR(S)        : Rune et al.

It is certified that error appears in the above-identified patent and that said Letters Patent is hereby corrected as shown below:

On the Title Page, Item (54), and in the specification, Column 1, Line 1, in Title, delete "METHOD" and insert -- METHODS --, therefor.

On Page 2, Item (56), under "OTHER PUBLICATIONS", in Column 2, Line 5, delete "Evolved" and insert -- Evolved Universal --, therefor.

In the specification,

In Column 1, Lines 10-11, delete "Aug. 23, 2007," and insert -- Mar. 23, 2007, --, therefor.

In Column 3, Line 55, delete "call." and insert -- call; --, therefor.

In Column 3, Line 58, delete "invention." and insert -- invention; --, therefor.

In Column 3, Line 61, delete "invention." and insert -- invention; --, therefor.

In Column 3, Line 64, delete "invention." and insert -- invention; --, therefor.

In Column 4, Line 50, delete "registered)," and insert -- registered, --, therefor.

In Column 4, Line 58, delete "Telephony" and insert -- Telephone --, therefor.

In Column 7, Line 2, delete "(-s)." and insert -- (s). --, therefor.

In Column 7, Line 9, delete "MME 42." and insert -- MME 40. --, therefor.

In Column 7, Line 32, delete "invention" and insert -- invention. --, therefor.

In Column 7, Line 66, delete "120)" and insert -- 120, --, therefor.

Signed and Sealed this
Twenty-second Day of March, 2016

Michelle K. Lee
*Director of the United States Patent and Trademark Office*

CERTIFICATE OF CORRECTION (continued)
U.S. Pat. No. 9,036,568 B2

In the specification,

In Column 12, Line 14, delete "(MSC/)VLR." and insert -- MSC/VLR. --, therefor.

In Column 15, Line 26, delete "In," and insert -- In --, therefor.

In Column 19, Line 59, delete "the an" and insert -- the --, therefor.

In Column 20, Line 38, delete "it is" and insert -- It is --, therefor.

In Column 20, Line 57, delete "connection)" and insert -- connection --, therefor.

In Column 21, Line 41, delete "to the a" and insert -- to the --, therefor.